US008940068B2

(12) United States Patent
Smith et al.

(10) Patent No.: US 8,940,068 B2

(45) Date of Patent: Jan. 27, 2015

(54) MAGNETICALLY DRIVEN ROTATING SEPARATOR

(75) Inventors: Bradley A. Smith, Columbus, IN (US); Kurt M. A. Badeau, Evansville, WI (US); Howard E. Tews, Beloit, WI (US); Roger L. Zoch, McFarland, WI (US)

(73) Assignee: Cummins Filtration IP Inc., Columbus, IN (US)

(*) Notice: Subject to any disclaimer, the term of this patent is extended or adjusted under 35 U.S.C. 154(b) by 298 days.

(21) Appl. No.: 13/167,814

(22) Filed: Jun. 24, 2011

(65) Prior Publication Data

US 2011/0247309 A1 Oct. 13, 2011

Related U.S. Application Data

(63) Continuation-in-part of application No. 12/969,742, filed on Dec. 16, 2010, and a continuation-in-part of application No. 12/969,755, filed on Dec. 16, 2010.

(60) Provisional application No. 61/383,790, filed on Sep.

(Continued)

(51) Int. Cl.

| | |
|---|---|
| ***B01D 45/14*** | (2006.01) |
| ***F01M 13/04*** | (2006.01) |

(Continued)

(52) U.S. Cl.

CPC ......... *F01M 13/04* (2013.01); *F01M 2013/027* (2013.01); *F01M 2013/0422* (2013.01); *F01M 2013/0438* (2013.01); *F02M 25/06* (2013.01)

USPC ................ 55/447; 55/330; 55/348; 55/350.1; 55/403; 55/408; 95/268; 95/269; 95/270; 95/277; 123/41.86; 123/43 R; 123/86

(58) Field of Classification Search

CPC ............ F01M 13/04; F01M 2013/027; F01M 2013/0438; F01M 2013/0422; F02M 25/06

USPC ................ 55/330, 345, 346, 347, 348, 350.1, 55/400–403, 406, 408, DIG. 19; 95/268–270, 273, 277; 123/41.86, 123/43 R, 86, 572–574

See application file for complete search history.

(56) References Cited

U.S. PATENT DOCUMENTS

| | | | |
|---|---|---|---|
| 630,365 | A | 8/1899 | LaPlace |
| 881,723 | A | 3/1908 | Scheibe |

(Continued)

FOREIGN PATENT DOCUMENTS

| | | |
|---|---|---|
| BE | 1 011 567 | 11/1999 |
| CN | 1671952 | 9/2005 |

(Continued)

OTHER PUBLICATIONS

Haldex, Alfdex Oil Mist Separator, www.haldex.com, Stockholm, Sweden, Sep. 2004, 6 pgs.

(Continued)

*Primary Examiner* — Robert A Hopkins

*Assistant Examiner* — Sonji Turner

(74) *Attorney, Agent, or Firm* — Foley & Lardner LLP

(57) ABSTRACT

A gas-liquid rotating separator has first and second sets of magnetically permeable members magnetically interacting with each other to effect rotation of a separator element. A nonauthorized replacement separator element missing the second set of magnetically permeable members will not effect designated operation, thus ensuring, at maintenance servicing, installation of an authorized replacement separator element.

38 Claims, 23 Drawing Sheets

Related U.S. Application Data 17, 2010, provisional application No. 61/298,630, filed on Jan. 27, 2010, provisional application No. 61/298,635, filed on Jan. 27, 2010, provisional application No. 61/359,192, filed on Jun. 28, 2010, provisional application No. 61/383,787, filed on Sep. 17, 2010, provisional application No. 61/383,793, filed on Sep. 17, 2010.

(51) Int. Cl.

| | |
|---|---|
| *F01M 13/02* | (2006.01) |
| *F02M 25/06* | (2006.01) |

(56) References Cited

U.S. PATENT DOCUMENTS

| | | | | | |
|---|---|---|---|---|---|
| 2,104,683 | A | | 1/1938 | Van Rosen et al. | |
| 2,443,875 | A | | 6/1948 | Spangenberger | |
| 2,713,960 | A | | 7/1955 | Siegal | |
| 2,714,960 | A | | 8/1955 | Schmid | |
| 2,795,291 | A | | 6/1957 | Pierce | |
| 3,073,516 | A | | 1/1963 | Glasson | |
| 3,234,716 | A | | 2/1966 | Roger et al. | |
| 3,289,397 | A | | 12/1966 | Schonewald et al. | |
| 3,299,335 | A | | 1/1967 | Wessels | |
| 3,333,703 | A | | 8/1967 | Scavuzzo | |
| 3,343,342 | A | | 9/1967 | Du | |
| 3,363,771 | A | | 1/1968 | Walters | |
| 3,447,290 | A | | 6/1969 | Flory | |
| 3,631,272 | A | * | 12/1971 | Kirii et al. | 310/10 |
| 3,753,492 | A | | 8/1973 | Aiello et al. | |
| 3,857,687 | A | | 12/1974 | Hamilton et al. | |
| 3,935,487 | A | * | 1/1976 | Czerniak | 310/46 |
| 4,138,234 | A | | 2/1979 | Kubesa | |
| 4,189,310 | A | | 2/1980 | Hotta | |
| 4,223,909 | A | | 9/1980 | Danner et al. | |
| 4,249,221 | A | | 2/1981 | Cox et al. | |
| 4,288,030 | A | | 9/1981 | Beazley et al. | |
| 4,311,933 | A | * | 1/1982 | Riggs et al. | 310/156.06 |
| 4,329,968 | A | | 5/1982 | Ishikawa et al. | |
| 4,411,675 | A | | 10/1983 | De Castella | |
| 4,482,365 | A | | 11/1984 | Roach | |
| 4,561,409 | A | | 12/1985 | Fernandez | |
| 4,714,139 | A | | 12/1987 | Lorenz et al. | |
| 4,871,455 | A | | 10/1989 | Terhune et al. | |
| 4,908,050 | A | | 3/1990 | Nagashima et al. | |
| 4,922,604 | A | * | 5/1990 | Marshall et al. | 29/598 |
| 4,981,502 | A | | 1/1991 | Gottschalk | |
| 5,035,797 | A | | 7/1991 | Janik | |
| 5,045,192 | A | | 9/1991 | Terhune | |
| 5,090,873 | A | | 2/1992 | Fain | |
| 5,095,238 | A | * | 3/1992 | Suzuki et al. | 310/156.46 |
| 5,171,430 | A | | 12/1992 | Beach et al. | |
| 5,205,848 | A | * | 4/1993 | Blanc et al. | 55/310 |
| 5,229,671 | A | * | 7/1993 | Neidhard et al. | 310/15 |
| 5,300,223 | A | | 4/1994 | Wright | |
| 5,342,519 | A | | 8/1994 | Friedmann et al. | |
| 5,429,101 | A | | 7/1995 | Uebelhoer et al. | |
| 5,450,835 | A | | 9/1995 | Wagner | |
| 5,471,966 | A | | 12/1995 | Feuling | |
| 5,536,289 | A | | 7/1996 | Spies et al. | |
| 5,538,626 | A | | 7/1996 | Baumann | |
| 5,548,893 | A | | 8/1996 | Koelfgen | |
| 5,549,821 | A | | 8/1996 | Bounnakhom et al. | |
| 5,556,542 | A | | 9/1996 | Berman et al. | |
| 5,575,511 | A | | 11/1996 | Kroha et al. | |
| 5,643,448 | A | | 7/1997 | Martin et al. | |
| 5,681,461 | A | | 10/1997 | Gullett et al. | |
| 5,685,985 | A | | 11/1997 | Brown et al. | |
| 5,702,602 | A | | 12/1997 | Brown et al. | |
| 5,737,378 | A | | 4/1998 | Ballas et al. | |
| 5,738,785 | A | | 4/1998 | Brown et al. | |
| 5,755,842 | A | | 5/1998 | Patel et al. | |
| 5,762,671 | A | | 6/1998 | Farrow et al. | |
| 5,770,065 | A | | 6/1998 | Popoff et al. | |
| 5,837,137 | A | | 11/1998 | Janik | |
| 5,846,416 | A | | 12/1998 | Gullett | |
| 5,911,213 | A | | 6/1999 | Ahlborn et al. | |
| 6,006,924 | A | | 12/1999 | Sandford | |
| 6,019,717 | A | | 2/2000 | Herman | |
| 6,068,763 | A | | 5/2000 | Goddard | |
| 6,123,061 | A | | 9/2000 | Baker et al. | |
| 6,139,595 | A | | 10/2000 | Herman et al. | |
| 6,139,738 | A | | 10/2000 | Maxwell | |
| 6,146,527 | A | | 11/2000 | Oelschlaegel | |
| 6,152,120 | A | * | 11/2000 | Julazadeh | 123/572 |
| 6,213,929 | B1 | | 4/2001 | May | |
| 6,281,319 | B1 | | 8/2001 | Mentak | |
| 6,364,822 | B1 | | 4/2002 | Herman et al. | |
| 6,506,302 | B2 | | 1/2003 | Janik | |
| 6,517,612 | B1 | | 2/2003 | Crouch et al. | |
| 6,527,821 | B2 | | 3/2003 | Liu et al. | |
| 6,640,792 | B2 | | 11/2003 | Harvey et al. | |
| 6,701,580 | B1 | | 3/2004 | Bandyopadhyay | |
| 6,709,477 | B1 | | 3/2004 | Haakansson et al. | |
| 6,752,924 | B2 | | 6/2004 | Gustafson et al. | |
| 6,755,896 | B2 | * | 6/2004 | Szepessy et al. | 95/270 |
| 6,821,319 | B1 | * | 11/2004 | Moberg et al. | 95/270 |
| 6,858,056 | B2 | | 2/2005 | Kwan | |
| 6,893,478 | B2 | | 5/2005 | Care et al. | |
| 6,925,993 | B1 | | 8/2005 | Eliasson et al. | |
| 6,986,805 | B2 | | 1/2006 | Gieseke et al. | |
| 7,000,894 | B2 | | 2/2006 | Olson et al. | |
| 7,022,163 | B2 | * | 4/2006 | Olsson et al. | 95/268 |
| 7,081,145 | B2 | | 7/2006 | Gieseke et al. | |
| 7,104,239 | B2 | | 9/2006 | Kawakubo et al. | |
| 7,152,589 | B2 | * | 12/2006 | Ekeroth et al. | 123/572 |
| 7,185,643 | B2 | | 3/2007 | Gronberg et al. | |
| 7,235,177 | B2 | * | 6/2007 | Herman et al. | 210/360.1 |
| 7,258,111 | B2 | | 8/2007 | Shieh et al. | |
| 7,294,948 | B2 | * | 11/2007 | Wasson et al. | 310/156.38 |
| 7,338,546 | B2 | | 3/2008 | Eliasson et al. | |
| 7,377,271 | B2 | | 5/2008 | Hoffmann et al. | |
| 7,396,373 | B2 | | 7/2008 | Lagerstedt et al. | |
| 7,465,341 | B2 | | 12/2008 | Eliasson | |
| 7,473,034 | B2 | | 1/2009 | Saito et al. | |
| 7,614,390 | B2 | * | 11/2009 | Holzmann et al. | 123/572 |
| 7,723,887 | B2 | * | 5/2010 | Yang et al. | 310/156.22 |
| 7,824,459 | B2 | | 11/2010 | Borgstrom et al. | |
| 8,177,875 | B2 | | 5/2012 | Rogers et al. | |
| 8,499,750 | B2 | | 8/2013 | Koyamaishi et al. | |
| 2001/0012814 | A1 | | 8/2001 | May et al. | |
| 2003/0024870 | A1 | | 2/2003 | Reinhart | |
| 2003/0034016 | A1 | | 2/2003 | Harvey et al. | |
| 2003/0233939 | A1 | * | 12/2003 | Szepessy et al. | 95/270 |
| 2004/0168415 | A1 | | 9/2004 | Hilpert et al. | |
| 2004/0206083 | A1 | | 10/2004 | Okuyama et al. | |
| 2004/0214710 | A1 | | 10/2004 | Herman et al. | |
| 2004/0226442 | A1 | * | 11/2004 | Olsson et al. | 95/270 |
| 2005/0060970 | A1 | | 3/2005 | Polderman | |
| 2005/0120685 | A1 | | 6/2005 | Fischer et al. | |
| 2005/0223687 | A1 | | 10/2005 | Miller et al. | |
| 2006/0048761 | A1 | * | 3/2006 | Ekeroth et al. | 123/572 |
| 2006/0090738 | A1 | | 5/2006 | Hoffmann et al. | |
| 2006/0145555 | A1 | * | 7/2006 | Petro et al. | 310/156.38 |
| 2006/0162305 | A1 | | 7/2006 | Reid | |
| 2007/0062887 | A1 | | 3/2007 | Schwandt et al. | |
| 2007/0084194 | A1 | | 4/2007 | Holm | |
| 2007/0107703 | A1 | | 5/2007 | Natkin | |
| 2007/0163215 | A1 | | 7/2007 | Lagerstadt | |
| 2007/0289632 | A1 | | 12/2007 | Della Casa | |
| 2008/0009402 | A1 | | 1/2008 | Kane et al. | |
| 2008/0250772 | A1 | | 10/2008 | Becker et al. | |
| 2008/0264251 | A1 | | 10/2008 | Szepessy | |
| 2008/0278022 | A1 | * | 11/2008 | Burch et al. | 310/156.38 |
| 2008/0290018 | A1 | | 11/2008 | Carew | |
| 2009/0000258 | A1 | * | 1/2009 | Carlsson et al. | 55/400 |
| 2009/0013658 | A1 | * | 1/2009 | Borgstrom et al. | 55/447 |
| 2009/0025562 | A1 | | 1/2009 | Hallgren et al. | |
| 2009/0025662 | A1 | | 1/2009 | Herman et al. | |
| 2009/0050121 | A1 | * | 2/2009 | Holzmann et al. | 123/573 |
| 2009/0126324 | A1 | | 5/2009 | Smith et al. | |
| 2009/0178964 | A1 | | 7/2009 | Cline et al. | |
| 2009/0186752 | A1 | * | 7/2009 | Isaksson et al. | 494/40 |

(56) References Cited

U.S. PATENT DOCUMENTS

| | | | |
|---|---|---|---|
| 2009/0223496 A1 | 9/2009 | Borgstrom et al. | |
| 2009/0249756 A1 | 10/2009 | Schrage et al. | |
| 2009/0266235 A1 | 10/2009 | Kane et al. | |
| 2009/0272085 A1 | 11/2009 | Gieseke et al. | |
| 2010/0011723 A1* | 1/2010 | Szepessy et al. | 55/438 |
| 2010/0043734 A1* | 2/2010 | Holzmann et al. | 123/41.86 |
| 2010/0180854 A1 | 7/2010 | Baumann et al. | |
| 2010/0229537 A1 | 9/2010 | Holm | |
| 2011/0005160 A1 | 1/2011 | Nihei | |
| 2011/0017155 A1 | 1/2011 | Jacob | |
| 2011/0056455 A1 | 3/2011 | Koyamaishi et al. | |
| 2011/0180051 A1 | 7/2011 | Schwandt et al. | |
| 2011/0180052 A1 | 7/2011 | Schwandt et al. | |
| 2011/0247309 A1 | 10/2011 | Smith et al. | |
| 2011/0252974 A1 | 10/2011 | Verdegan et al. | |
| 2011/0281712 A1* | 11/2011 | Schlamann et al. | 494/7 |

FOREIGN PATENT DOCUMENTS

| | | |
|---|---|---|
| CN | 2809233 | 8/2006 |
| CN | 1961139 | 5/2007 |
| CN | 1961139 A | 5/2007 |
| CN | 101189414 | 5/2008 |
| CN | 101549331 | 10/2009 |
| EP | 844012 | 5/1998 |
| EP | 0880987 | 12/1998 |
| WO | WO-2009/005355 | 1/2009 |
| WO | WO-2009/138872 A1 | 11/2009 |
| WO | 2010/051994 | 5/2010 |

OTHER PUBLICATIONS

Example of Simplified Squirrel Cage Motor, www.animations.physics.unsw.edu.au, p. 5, website visited Apr. 25, 2011.

Final Office Action received for U.S. Appl. No. 12/969,742 dated Dec. 23, 2013.

Final Office Action received for U.S. Appl. No. 12/969,742 dated May 20, 2013.

Non-final Office Action received for U.S. Appl. No. 12/969,742 dated Aug. 27, 2013.

Non-final Office Action received for U.S. Appl. No. 12/969,742 dated Feb. 13, 2013.

Non-final Office Action received for U.S. Appl. No. 12/969,755 dated Jan. 29, 2013.

Non-final Office Action received for U.S. Appl. No. 13/167,820 dated Oct. 22, 2013.

* cited by examiner

MAGNETICALLY DRIVEN ROTATING SEPARATOR

CROSS-REFERENCE TO RELATED APPLICATION

The present application claims the benefit of and priority from Provisional U.S. Patent Application No. 61/383,790, filed Sep. 17, 2010. The present application is a continuation-in-part of U.S. patent application Ser. No. 12/969,742, filed Dec. 16, 2010, and U.S. patent application Ser. No. 12/969,755, filed Dec. 16, 2010. The '742 and '755 applications claim the benefit of and priority from Provisional U.S. Patent Application No. 61/298,630, filed Jan. 27, 2010, Provisional U.S. Patent Application No. 61/298,635, filed Jan. 27, 2010, Provisional U.S. Patent Application No. 61/359,192, filed Jun. 28, 2010, Provisional U.S. Patent Application No. 61/383,787, filed Sep. 17, 2010, Provisional U.S. Patent Application No. 61/383,790, filed Sep. 17, 2010, and Provisional U.S. Patent Application No. 61/383,793, filed Sep. 17, 2010. All of the above are hereby incorporated herein by reference.

BACKGROUND AND SUMMARY

Parent Applications

The noted parent '742 and '755 applications relate to internal combustion engine crankcase ventilation separators, particularly coalescers. Internal combustion engine crankcase ventilation separators are known in the prior art. One type of separator uses inertial impaction air-oil separation for removing oil particles from the crankcase blowby gas or aerosol by accelerating the blowby gas stream to high velocities through nozzles or orifices and directing same against an impactor, causing a sharp directional change effecting the oil separation. Another type of separator uses coalescence in a coalescing filter for removing oil droplets. The inventions of the parent '742 and '755 applications arose during continuing development efforts in the latter noted air-oil separation technology, namely removal of oil from the crankcase blowby gas stream by coalescence using a coalescing filter.

Present Application

The present invention arose during continuing development efforts in gas-liquid separation technology, including the above noted technology, and including a rotating separator separating gas from a gas-liquid mixture, including air-oil and other gas-liquid mixtures.

In one embodiment, the present disclosure provides an authentication system ensuring that during maintenance servicing, the rotating separator element must be replaced only by an authorized replacement element, to ensure designated operation and performance, and that a nonauthorized aftermarket replacement element will not provide the noted designated operation and performance. In one embodiment, this ensures that an internal combustion engine being protected by a crankcase ventilation air-oil separator will receive at least the minimum level of protection from gas-borne contaminant that is necessary to achieve target levels for engine reliability and performance.

Applicant notes commonly owned co-pending U.S. patent application Ser. No. 13/167,820, filed on even date herewith, for another disclosure preventing use of a nonauthorized replacement element during maintenance servicing.

BRIEF DESCRIPTION OF THE DRAWINGS

Parent Applications

FIG. 1 is a sectional view of a coalescing filter assembly.

FIG. 2 is a sectional view of another coalescing filter assembly.

FIG. 3 shows another embodiment for a drive mechanism.

FIG. 4 is a sectional view of another coalescing filter assembly.

FIG. 5 is a schematic view illustrating operation of the assembly of FIG. 4.

FIG. 6 is a schematic system diagram illustrating an engine intake system.

FIG. 7 is a schematic diagram illustrating a control option for the system of FIG. 6.

FIG. 8 is a flow diagram illustrating an operational control for the system of FIG. 6.

FIG. 9 is like FIG. 8 and shows another embodiment.

FIG. 10 is a schematic sectional view show a coalescing filter assembly.

FIG. 11 is an enlarged view of a portion of FIG. 10.

FIG. 12 is a schematic sectional view of a coalescing filter assembly.

FIG. 13 is a schematic sectional view of a coalescing filter assembly.

FIG. 14 is a schematic sectional view of a coalescing filter assembly.

FIG. 15 is a schematic sectional view of a coalescing filter assembly.

FIG. 16 is a schematic sectional view of a coalescing filter assembly.

FIG. 17 is a schematic view of a coalescing filter assembly.

FIG. 18 is a schematic sectional view of a coalescing filter assembly.

FIG. 19 is a schematic diagram illustrating a control system.

FIG. 20 is a schematic diagram illustrating a control system.

FIG. 21 is a schematic diagram illustrating a control system.

Present Application

Figure 22:
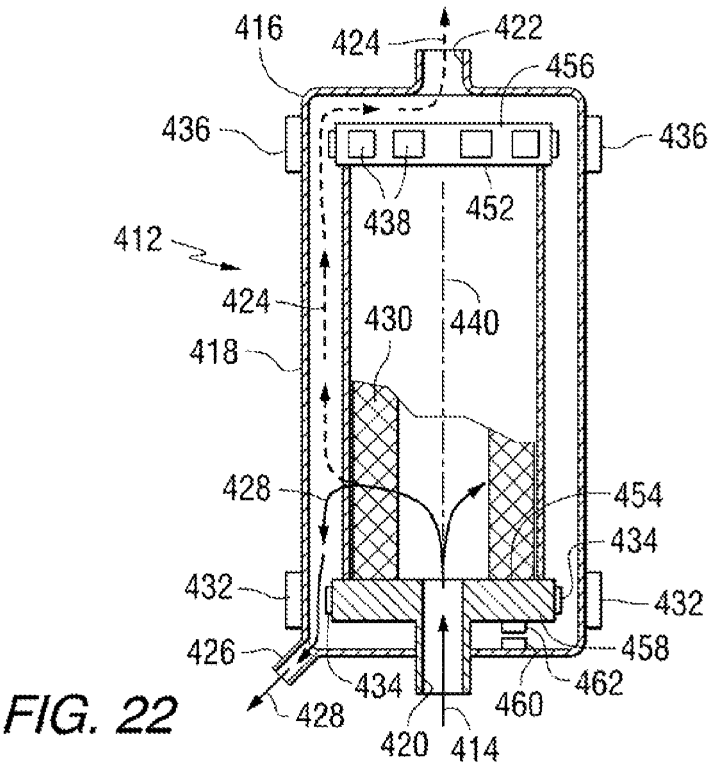

FIG. 22 is a partial section view of a magnetically driven gas-liquid rotating separator.

Figure 23:
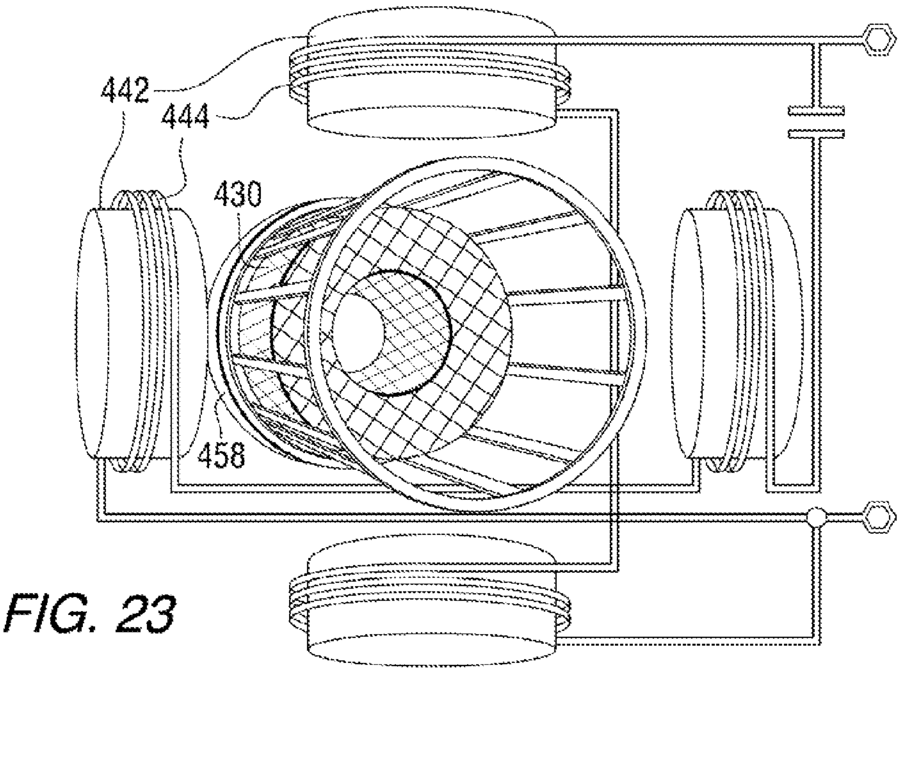

FIG. 23 is a schematic illustration showing a drive arrangement.

Figure 24:
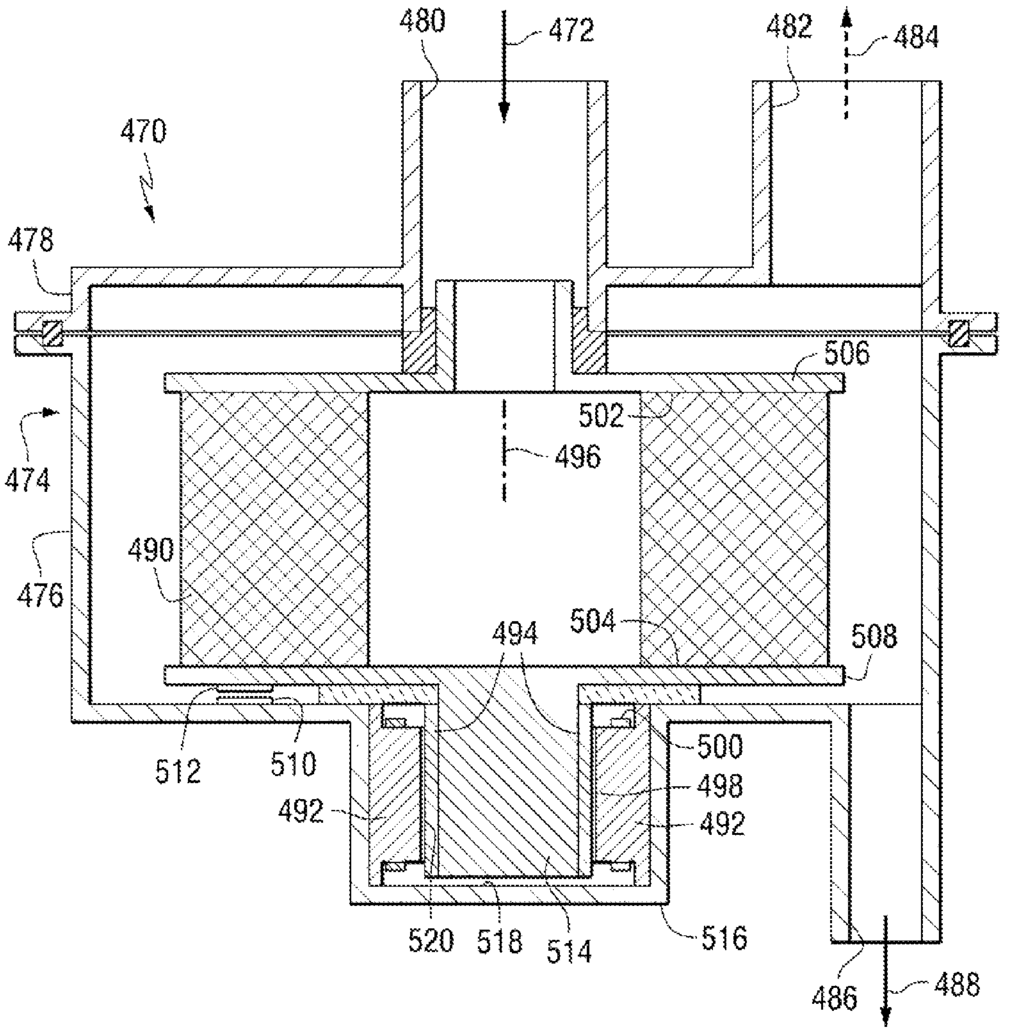

FIG. 24 is a schematic sectional view showing a magnetically driven separator assembly.

Figure 25:
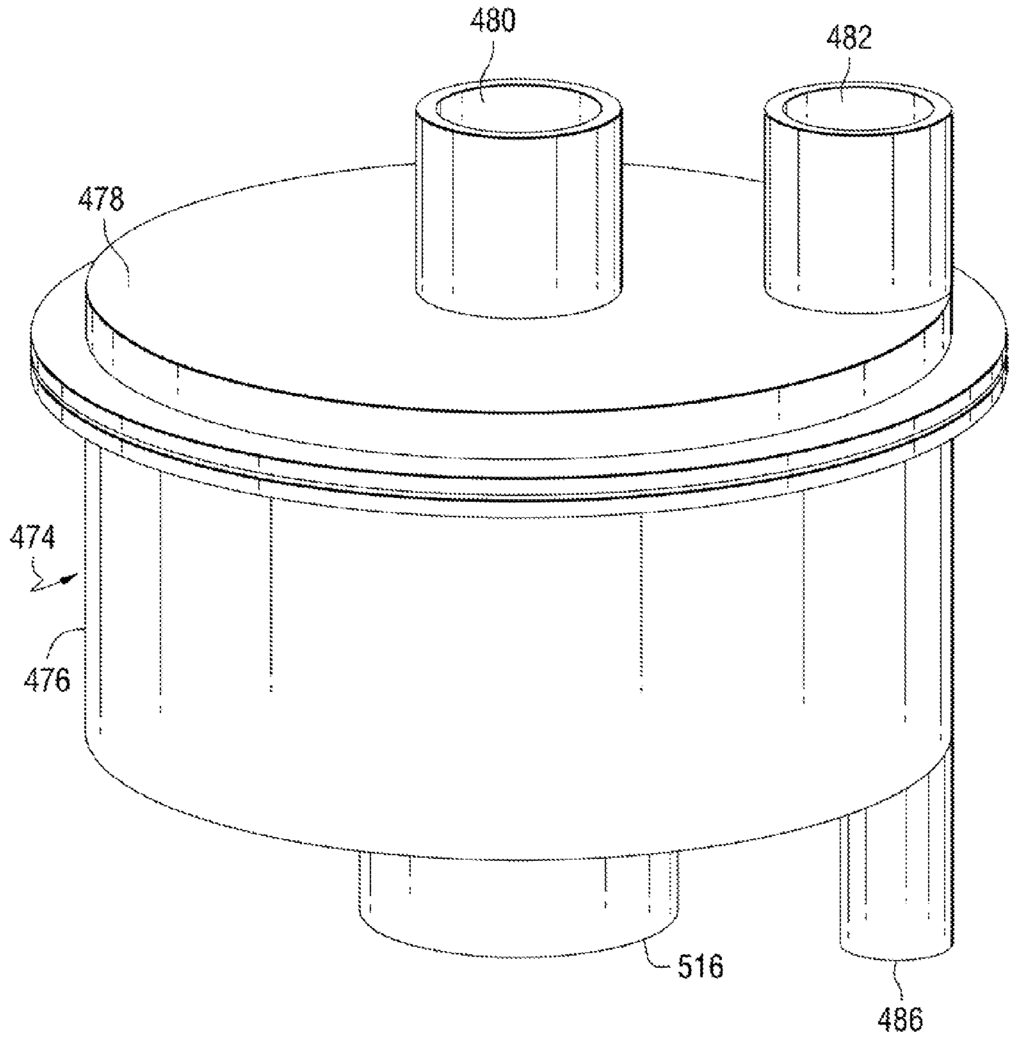

FIG. 25 is a perspective view of the assembly of FIG. 24.

Figure 26:
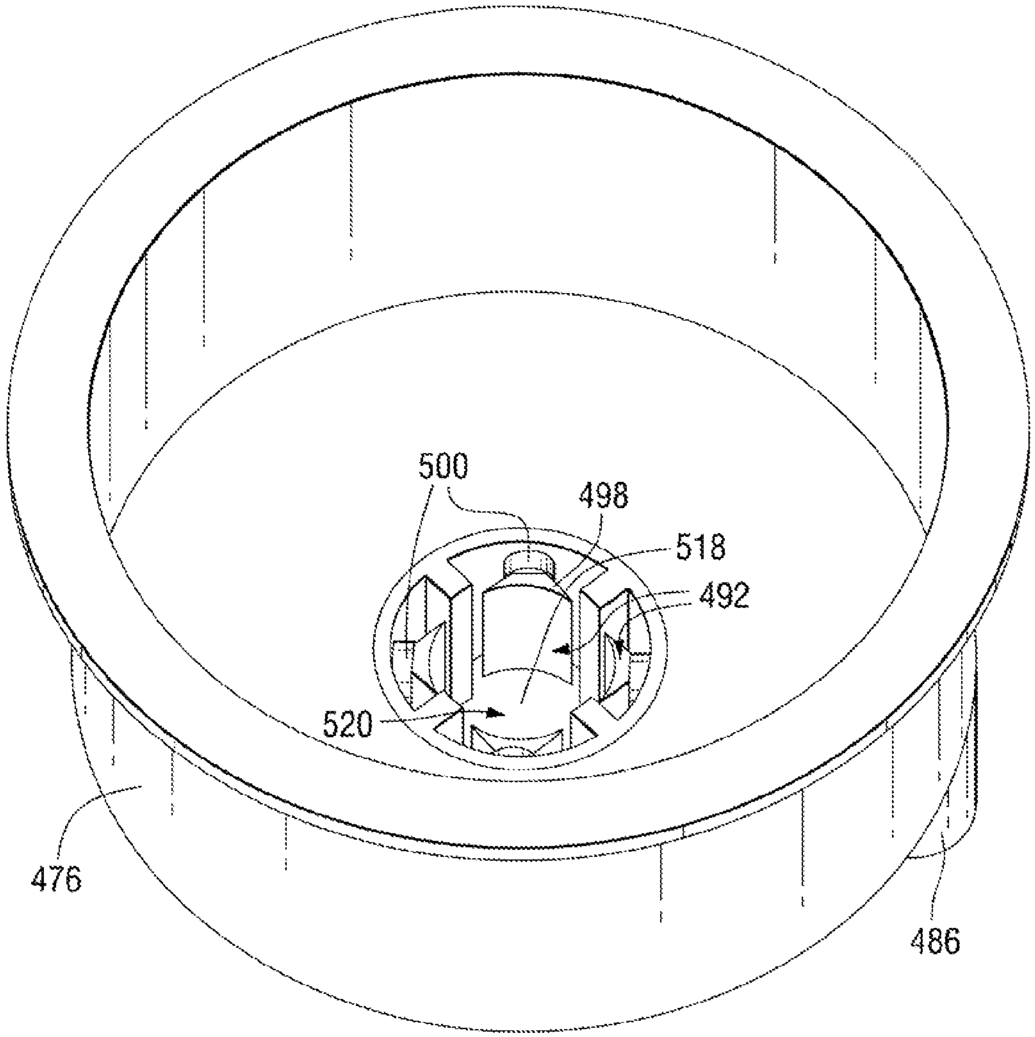

FIG. 26 is a perspective view of a component of FIG. 24.

Figure 27:
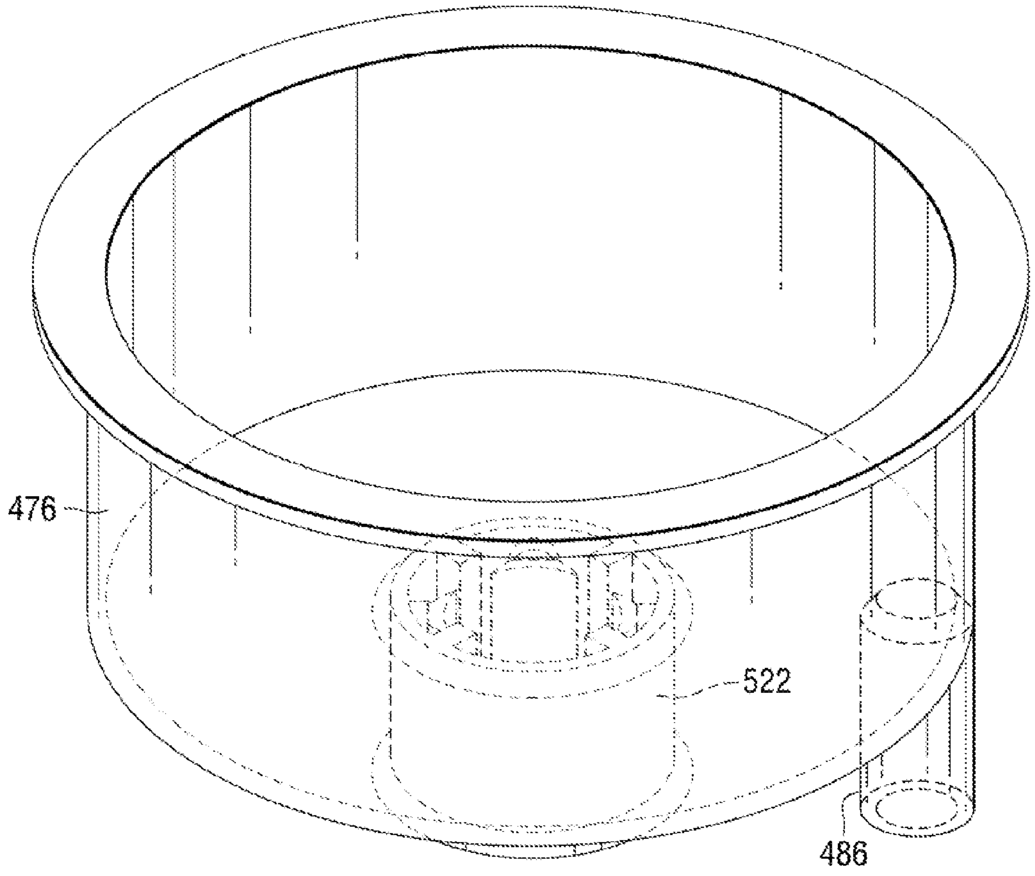

FIG. 27 is a perspective view of another embodiment of a component of FIG. 24.

Figure 28:
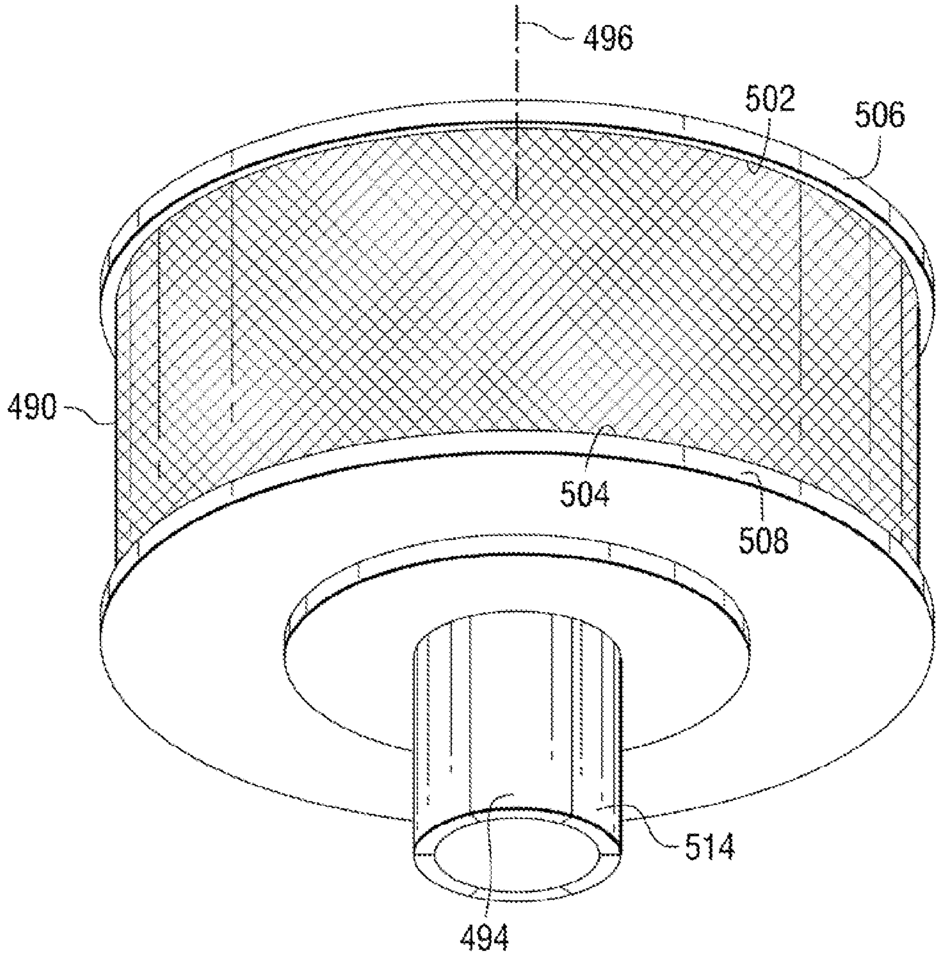

FIG. 28 is a perspective view of the filter element of FIG. 24.

Figure 29:
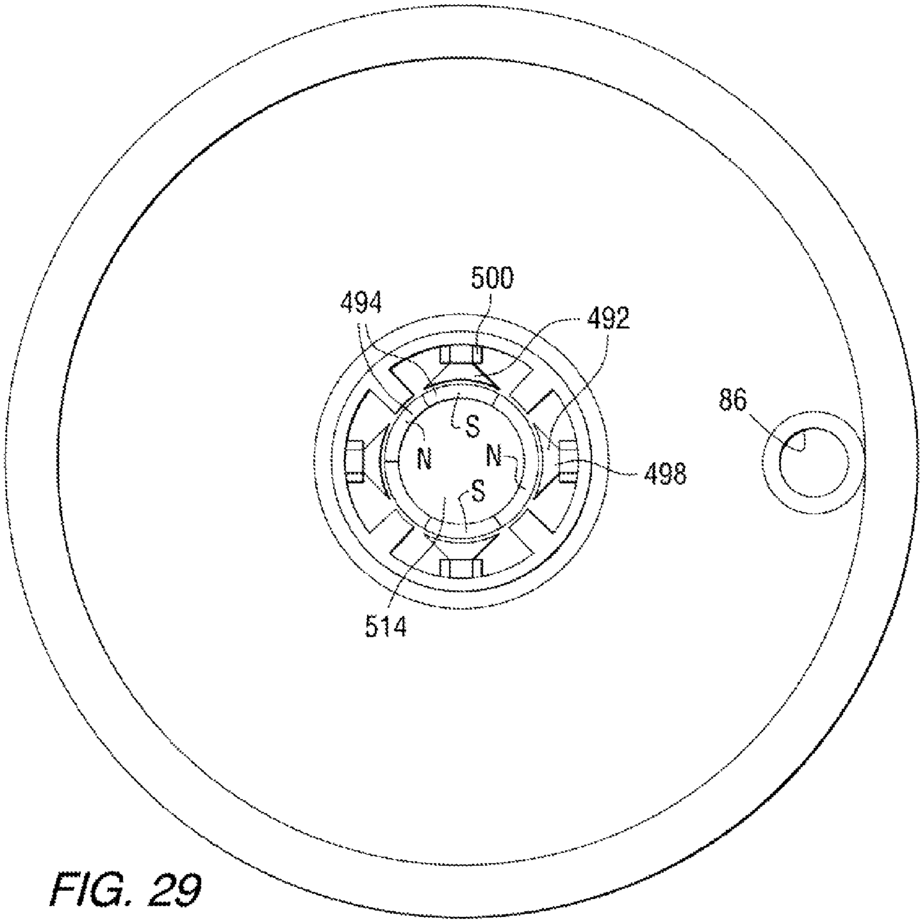

FIG. 29 is a top view of a component of FIG. 24.

Figure 30:
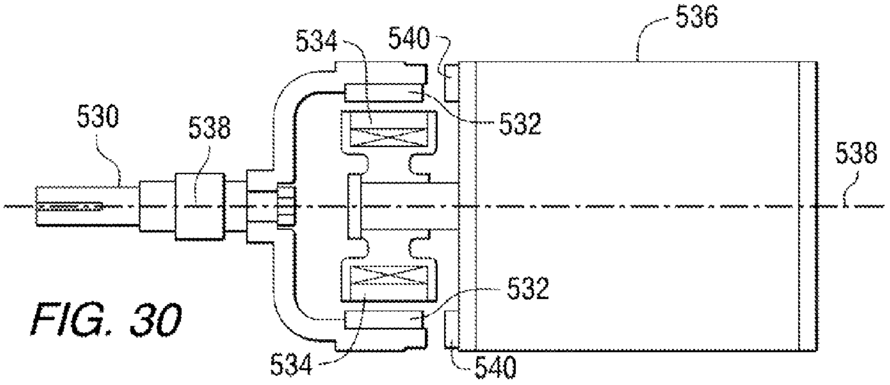

FIG. 30 is a schematic illustration showing another embodiment.

DETAILED DESCRIPTION

Parent Applications

The following description of FIGS. 1-21 is taken from commonly owned co-pending parent U.S. patent application Ser. No. 12/969,742, filed Dec. 16, 2010, which shares a common specification with commonly owned co-pending parent U.S. patent application Ser. No. 12/969,755, filed Dec. 16, 2010.

Figure 1:
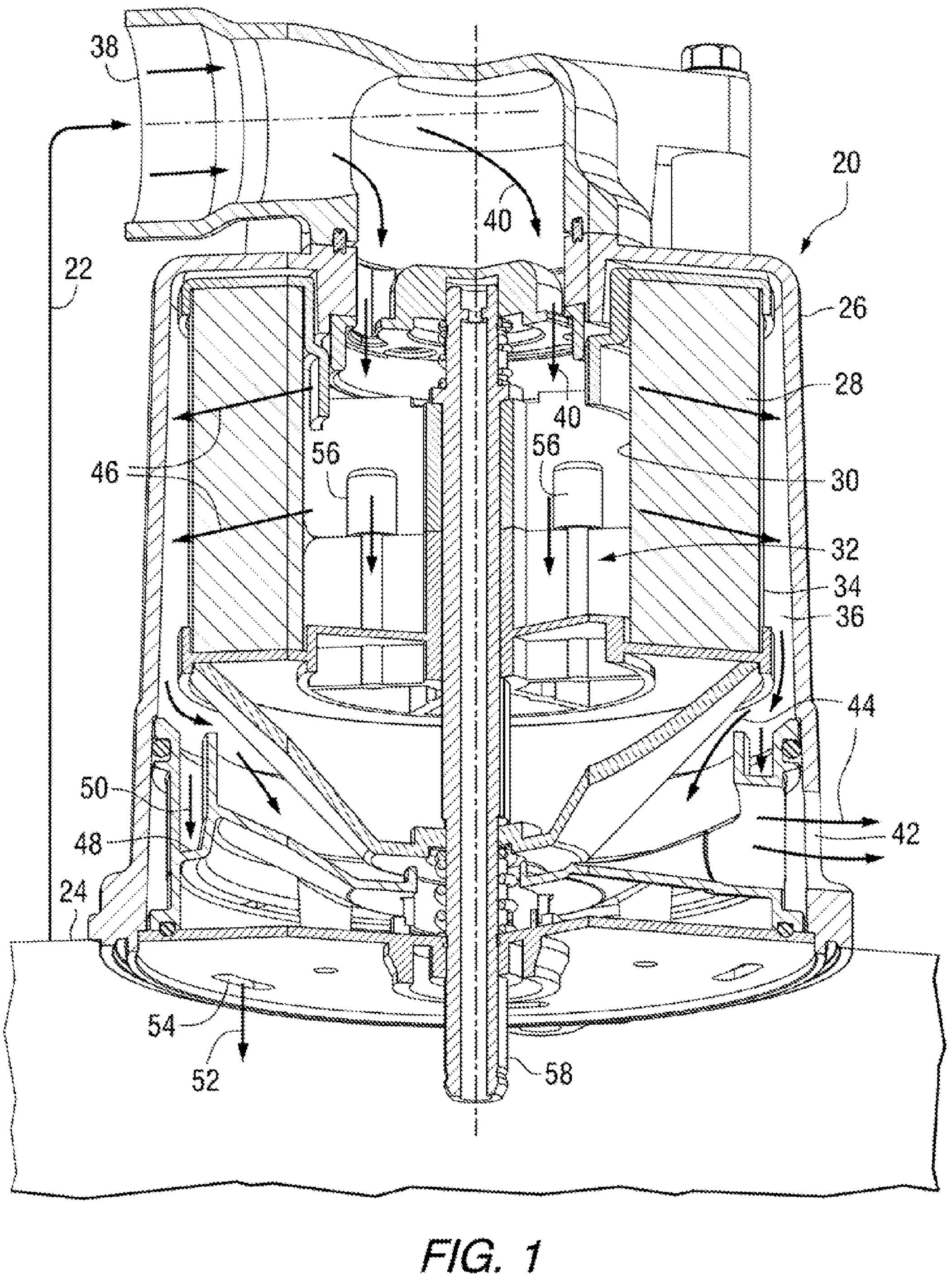
FIGS. 1-21 are taken from parent U.S. patent application Ser. No. 12/969,742.

FIG. 1 shows an internal combustion engine crankcase ventilation rotating coalescer 20 separating air from oil in blowby gas 22 from engine crankcase 24. A coalescing filter assembly 26 includes an annular rotating coalescing filter element 28 having an inner periphery 30 defining a hollow interior 32, and an outer periphery 34 defining an exterior 36. An inlet port 38 supplies blowby gas 22 from crankcase 24 to hollow interior 32 as shown at arrows 40. An outlet port 42 delivers cleaned separated air from the noted exterior zone 36 as shown at arrows 44. The direction of blowby gas flow is inside-out, namely radially outwardly from hollow interior 32 to exterior 36 as shown at arrows 46. Oil in the blowby gas is forced radially outwardly from inner periphery 30 by centrifugal force, to reduce clogging of the coalescing filter element 28 otherwise caused by oil sitting on inner periphery 30. This also opens more area of the coalescing filter element to flow-through, whereby to reduce restriction and pressure drop. Centrifugal force drives oil radially outwardly from inner periphery 30 to outer periphery 34 to clear a greater volume of coalescing filter element 28 open to flow-through, to increase coalescing capacity. Separated oil drains from outer periphery 34. Drain port 48 communicates with exterior 36 and drains separated oil from outer periphery 34 as shown at arrow 50, which oil may then be returned to the engine crankcase as shown at arrow 52 from drain 54.

Centrifugal force pumps blowby gas from the crankcase to hollow interior 32. The pumping of blowby gas from the crankcase to hollow interior 32 increases with increasing speed of rotation of coalescing filter element 28. The increased pumping of blowby gas 22 from crankcase 24 to hollow interior 32 reduces restriction across coalescing filter element 28. In one embodiment, a set of vanes may be provided in hollow interior 32 as shown in dashed line at 56, enhancing the noted pumping. The noted centrifugal force creates a reduced pressure zone in hollow interior 32, which reduced pressure zone sucks blowby gas 22 from crankcase 24.

Figure 2:
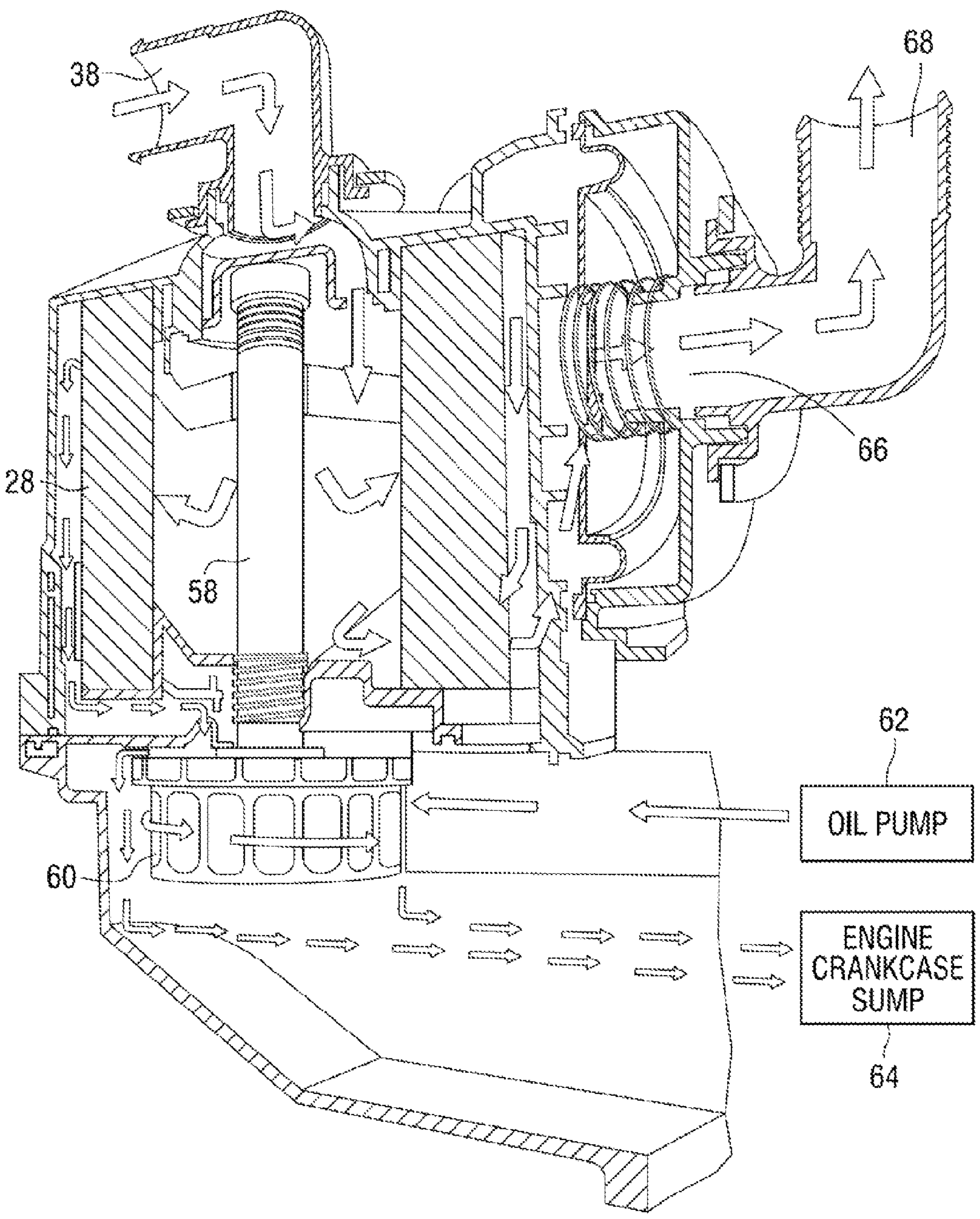
Figure 3:
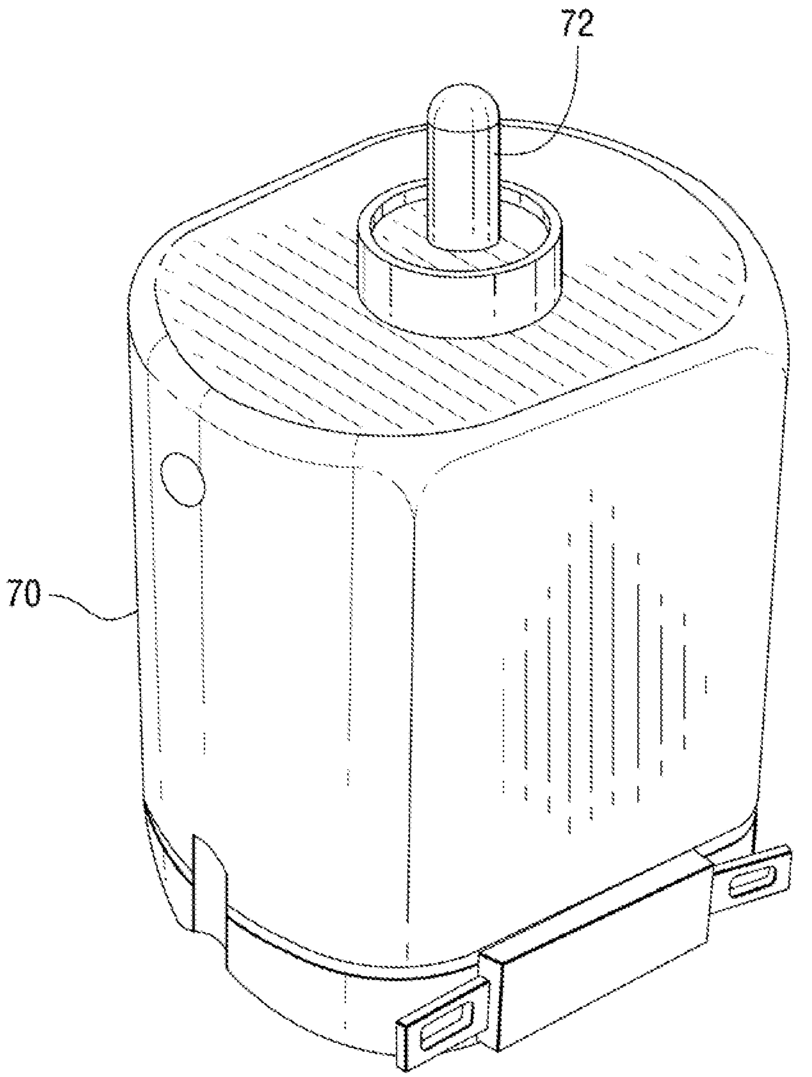
Figure 4:
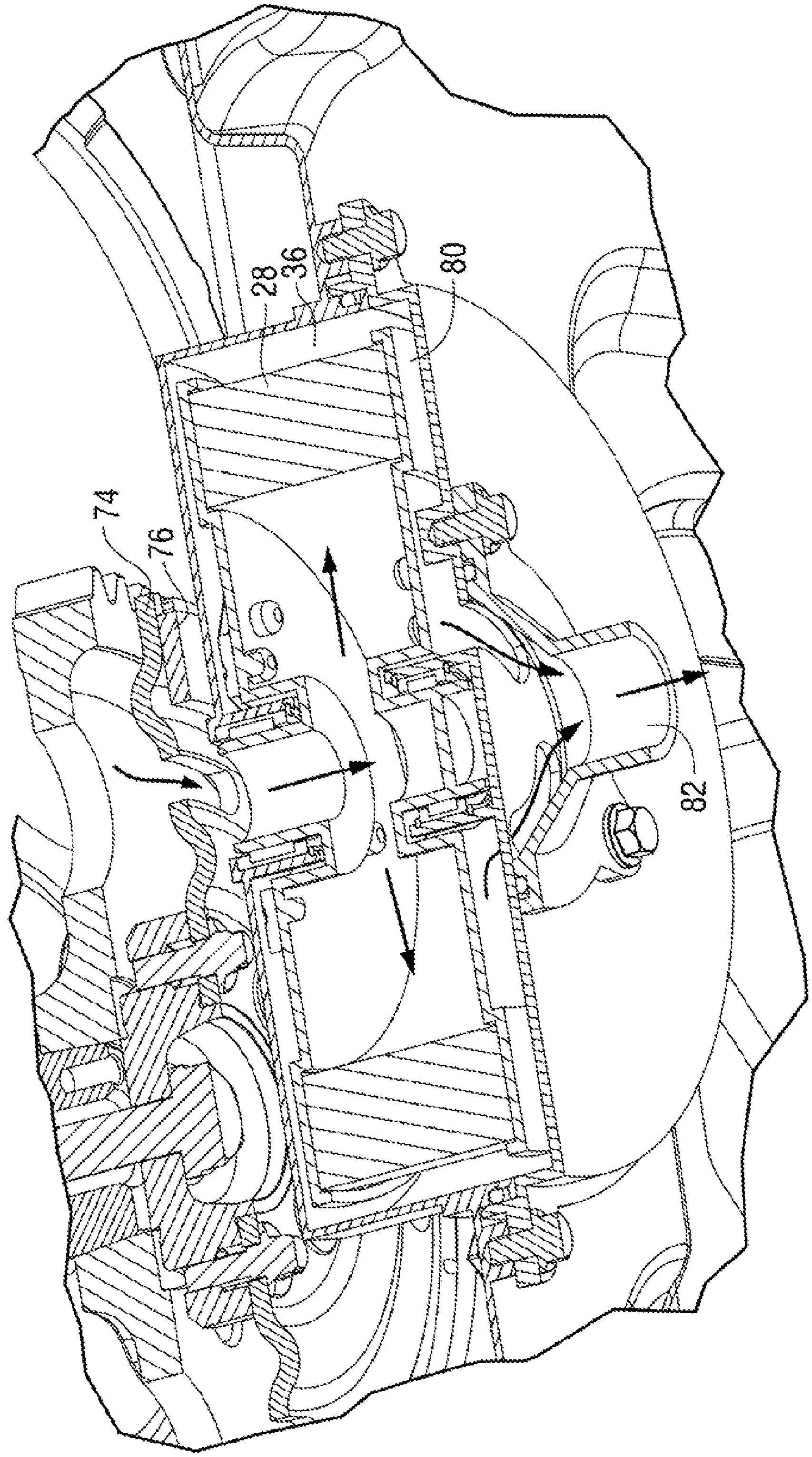
Figure 5:
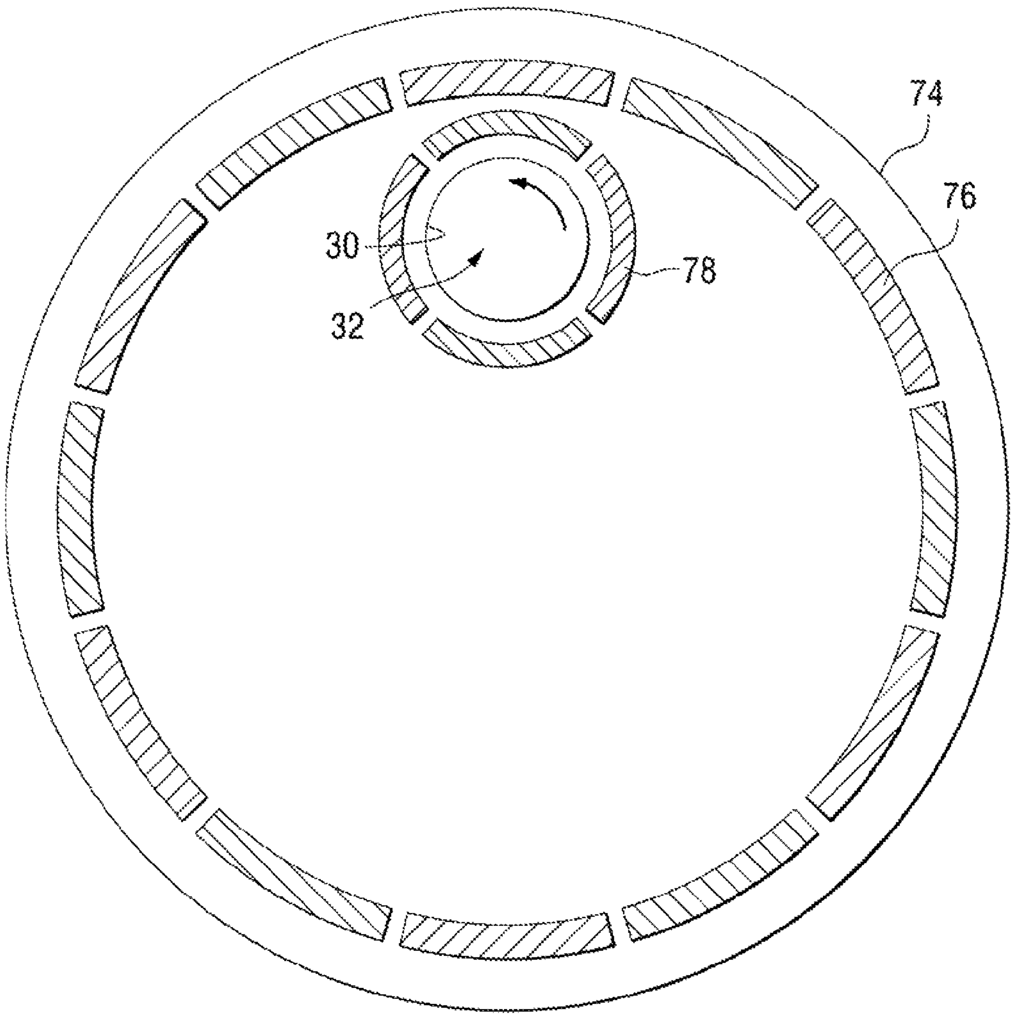

In one embodiment, coalescing filter element 28 is driven to rotate by a mechanical coupling to a component of the engine, e.g. axially extending shaft 58 connected to a gear or drive pulley of the engine. In another embodiment, coalescing filter element 28 is driven to rotate by a fluid motor, e.g. a pelton or turbine drive wheel 60, FIG. 2, driven by pumped pressurized oil from the engine oil pump 62 and returning same to engine crankcase sump 64. FIG. 2 uses like reference numerals from FIG. 1 where appropriate to facilitate understanding. Separated cleaned air is supplied through pressure responsive valve 66 to outlet 68 which is an alternate outlet to that shown at 42 in FIG. 1. In another embodiment, coalescing filter element 28 is driven to rotate by an electric motor 70, FIG. 3, having a drive output rotary shaft 72 coupled to shaft 58. In another embodiment, coalescing filter element 28 is driven to rotate by magnetic coupling to a component of the engine, FIGS. 4, 5. An engine driven rotating gear 74 has a plurality of magnets such as 76 spaced around the periphery thereof and magnetically coupling to a plurality of magnets 78 spaced around inner periphery 30 of the coalescing filter element such that as gear or driving wheel 74 rotates, magnets 76 move past, FIG. 5, and magnetically couple with magnets 78, to in turn rotate the coalescing filter element as a driven member. In FIG. 4, separated cleaned air flows from exterior zone 36 through channel 80 to outlet 82, which is an alternate cleaned air outlet to that shown at 42 in FIG. 1. The arrangement in FIG. 5 provides a gearing-up effect to rotate the coalescing filter assembly at a greater rotational speed (higher angular velocity) than driving gear or wheel 74, e.g. where it is desired to provide a higher rotational speed of the coalescing filter element.

Pressure drop across coalescing filter element 28 decreases with increasing rotational speed of the coalescing filter element. Oil saturation of coalescing filter element 28 decreases with increasing rotational speed of the coalescing filter element. Oil drains from outer periphery 34, and the amount of oil drained increases with increasing rotational speed of coalescing filter element 28. Oil particle settling velocity in coalescing filter element 28 acts in the same direction as the direction of air flow through the coalescing filter element. The noted same direction enhances capture and coalescence of oil particles by the coalescing filter element.

The system provides a method for separating air from oil in internal combustion engine crankcase ventilation blowby gas by introducing a G force in coalescing filter element 28 to cause increased gravitational settling in the coalescing filter element, to improve particle capture and coalescence of submicron oil particles by the coalescing filter element. The method includes providing an annular coalescing filter element 28, rotating the coalescing filter element, and providing inside-out flow through the rotating coalescing filter element.

The system provides a method for reducing crankcase pressure in an internal combustion engine crankcase generating blowby gas. The method includes providing a crankcase ventilation system including a coalescing filter element 28 separating oil from air in the blowby gas, providing the coalescing filter element as an annular element having a hollow interior 32, supplying the blowby gas to the hollow interior, and rotating the coalescing filter element to pump blowby gas out of crankcase 24 and into hollow interior 32 due to centrifugal force forcing the blowby gas to flow radially outwardly as shown at arrows 46 through coalescing filter element 28, which pumping effects reduced pressure in crankcase 24.

One type of internal combustion engine crankcase ventilation system provides open crankcase ventilation (OCV), wherein the cleaned air separated from the blowby gas is discharged to the atmosphere. Another type of internal combustion crankcase ventilation system involves closed crankcase ventilation (CCV), wherein the cleaned air separated from the blowby gas is returned to the engine, e.g. is returned to the combustion air intake system to be mixed with the incoming combustion air supplied to the engine.

Figure 6:
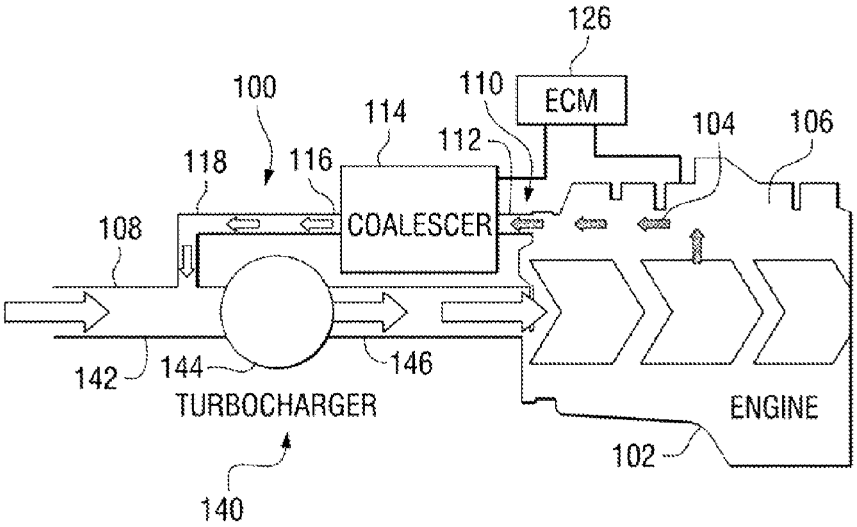
Figure 7:
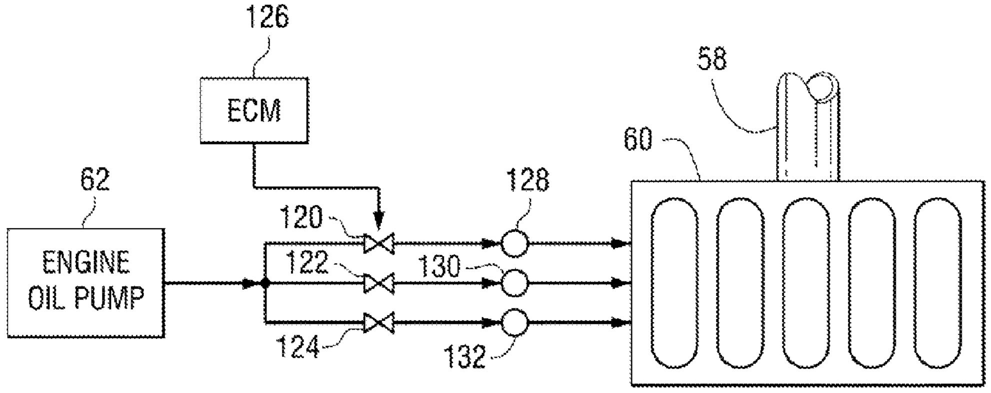

FIG. 6 shows a closed crankcase ventilation (CCV) system 100 for an internal combustion engine 102 generating blowby gas 104 in a crankcase 106. The system includes an air intake duct 108 supplying combustion air to the engine, and a return duct 110 having a first segment 112 supplying the blowby gas from the crankcase to air-oil coalescer 114 to clean the blowby gas by coalescing oil therefrom and outputting cleaned air at output 116, which may be outlet 42 of FIG. 1, 68 of FIG. 2, 82 of FIG. 4. Return duct 110 includes a second segment 118 supplying the cleaned air from coalescer 114 to air intake duct 108 to join the combustion air being supplied to the engine. Coalescer 114 is variably controlled according to a given condition of the engine, to be described.

Coalescer 114 has a variable efficiency variably controlled according to a given condition of the engine. In one embodiment, coalescer 114 is a rotating coalescer, as above, and the speed of rotation of the coalescer is varied according to the given condition of the engine. In one embodiment, the given condition is engine speed. In one embodiment, the coalescer is driven to rotate by an electric motor, e.g. 70, FIG. 3. In one embodiment, the electric motor is a variable speed electric motor to vary the speed of rotation of the coalescer. In another embodiment, the coalescer is hydraulically driven to rotate, e.g. FIG. 2. In one embodiment, the speed of rotation of the coalescer is hydraulically varied. In this embodiment, the engine oil pump 62, FIGS. 2, 7, supplies pressurized oil through a plurality of parallel shut-off valves such as 120, 122, 124 which are controlled between closed and open or partially open states by the electronic control module (ECM) 126 of the engine, for flow through respective parallel orifices or nozzles 128, 130, 132 to controllably increase or decrease the amount of pressurized oil supplied against pelton or turbine wheel 60, to in turn controllably vary the speed of rotation of shaft 58 and coalescing filter element 28.

In one embodiment, a turbocharger system 140, FIG. 6, is provided for the internal combustion 102 generating blowby gas 104 in crankcase 106. The system includes the noted air intake duct 108 having a first segment 142 supplying combustion air to a turbocharger 144, and a second segment 146 supplying turbocharged combustion air from turbocharger 144 to engine 102. Return duct 110 has the noted first segment 112 supplying the blowby gas 104 from crankcase 106 to air-oil coalescer 114 to clean the blowby gas by coalescing oil therefrom and outputting cleaned air at 116. The return duct has the noted second segment 118 supplying cleaned air from coalescer 114 to first segment 142 of air intake duct 108 to join combustion air supplied to turbocharger 144. Coalescer 114 is variably controlled according to a given condition of at least one of turbocharger 144 and engine 102. In one embodiment, the given condition is a condition of the turbocharger. In a further embodiment, the coalescer is a rotating coalescer, as above, and the speed of rotation of the coalescer is varied according to turbocharger efficiency. In a further embodiment, the speed of rotation of the coalescer is varied according to turbocharger boost pressure. In a further embodiment, the speed of rotation of the coalescer is varied according to turbocharger boost ratio, which is the ratio of pressure at the turbocharger outlet versus pressure at the turbocharger inlet. In a further embodiment, the coalescer is driven to rotate by an electric motor, e.g. 70, FIG. 3. In a further embodiment, the electric motor is a variable speed electric motor to vary the speed of rotation of the coalescer. In another embodiment, the coalescer is hydraulically driven to rotate, FIG. 2. In a further embodiment, the speed of rotation of the coalescer is hydraulically varied, FIG. 7.

The system provides a method for improving turbocharger efficiency in a turbocharger system 140 for an internal combustion engine 102 generating blowby gas 104 in a crankcase 106, the system having an air intake duct 108 having a first segment 142 supplying combustion air to a turbocharger 144, and a second segment 146 supplying turbocharged combustion air from the turbocharger 144 to the engine 102, and having a return duct 110 having a first segment 112 supplying the blowby gas 104 to air-oil coalescer 114 to clean the blowby gas by coalescing oil therefrom and outputting cleaned air at 116, the return duct having a second segment 118 supplying the cleaned air from the coalescer 114 to the first segment 142 of the air intake duct to join combustion air supplied to turbocharger 144. The method includes variably controlling coalescer 114 according to a given condition of at least one of turbocharger 144 and engine 102. One embodiment variably controls coalescer 114 according to a given condition of turbocharger 144. A further embodiment provides the coalescer as a rotating coalescer, as above, and varies the speed of rotation of the coalescer according to turbocharger efficiency. A further method varies the speed of rotation of coalescer 114 according to turbocharger boost pressure. A further embodiment varies the speed of rotation of coalescer 114 according to turbocharger boost ratio, which is the ratio of pressure at the turbocharger outlet versus pressure at the turbocharger inlet.

Figure 8:
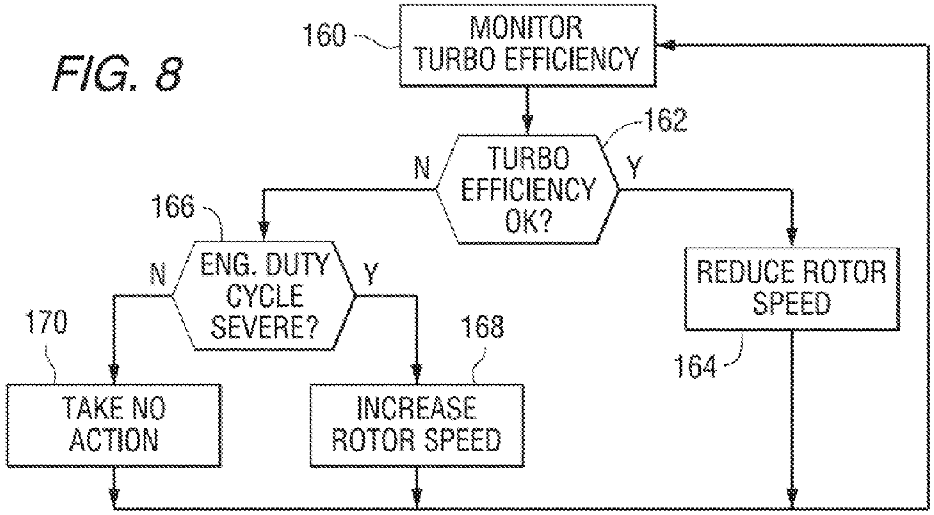

FIG. 8 shows a control scheme for CCV implementation. At step 160, turbocharger efficiency is monitored, and if the turbo efficiency is ok as determined at step 162, then rotor speed of the coalescing filter element is reduced at step 164. If the turbocharger efficiency is not ok, then engine duty cycle is checked at step 166, and if the engine duty cycle is not severe then rotor speed is increased at step 168, and if engine duty cycle is not severe then no action is taken as shown at step 170.

Figure 9:
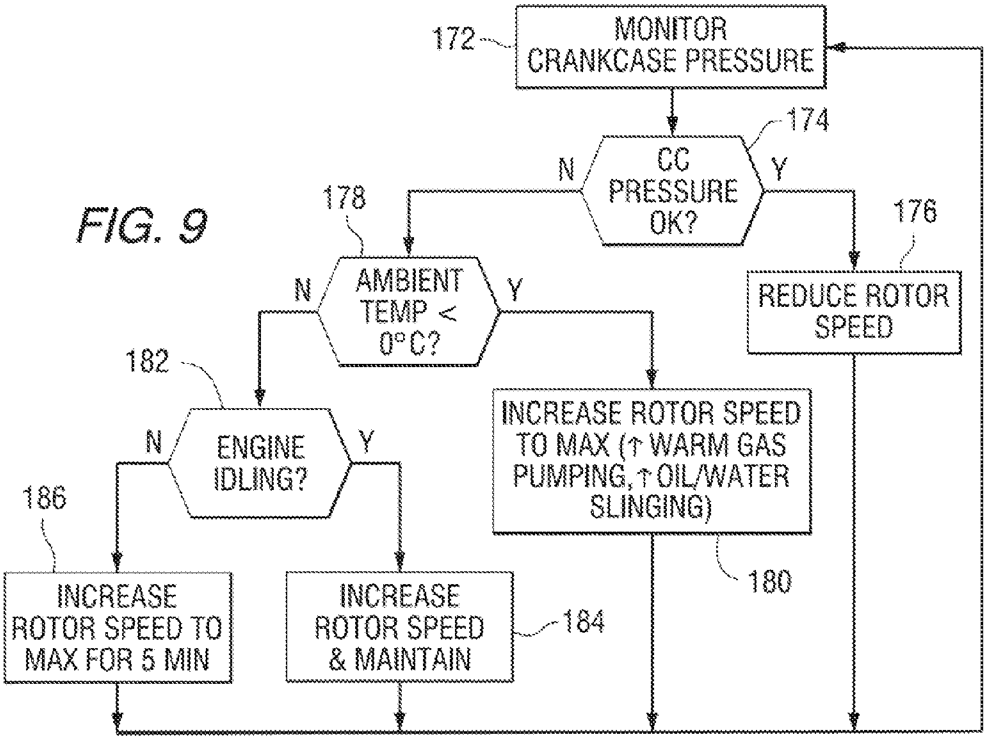

FIG. 9 shows a control scheme for OCV implementation. Crankcase pressure is monitored at step 172, and if it is ok as determined at step 174 then rotor speed is reduced at step 176, and if not ok then ambient temperature is checked at step 178 and if less than 0° C., then at step 180 rotor speed is increased to a maximum to increase warm gas pumping and increase oil-water slinging. If ambient temperature is not less than 0° C., then engine idling is checked at step 182, and if the engine is idling then at step 184 rotor speed is increased and maintained, and if the engine is not idling, then at step 186 rotor speed is increased to a maximum for five minutes.

Figure 10:
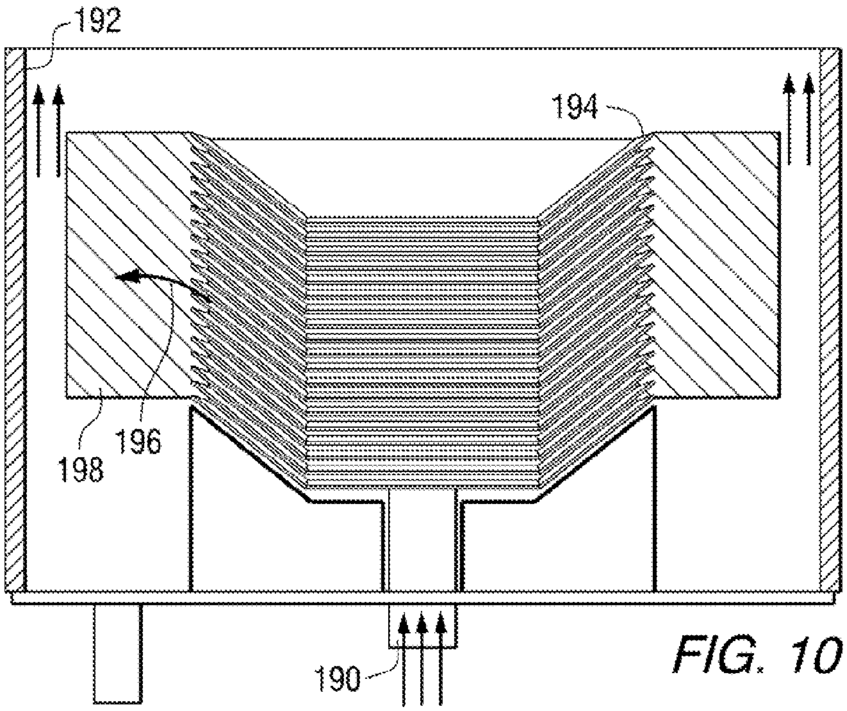
Figure 11:
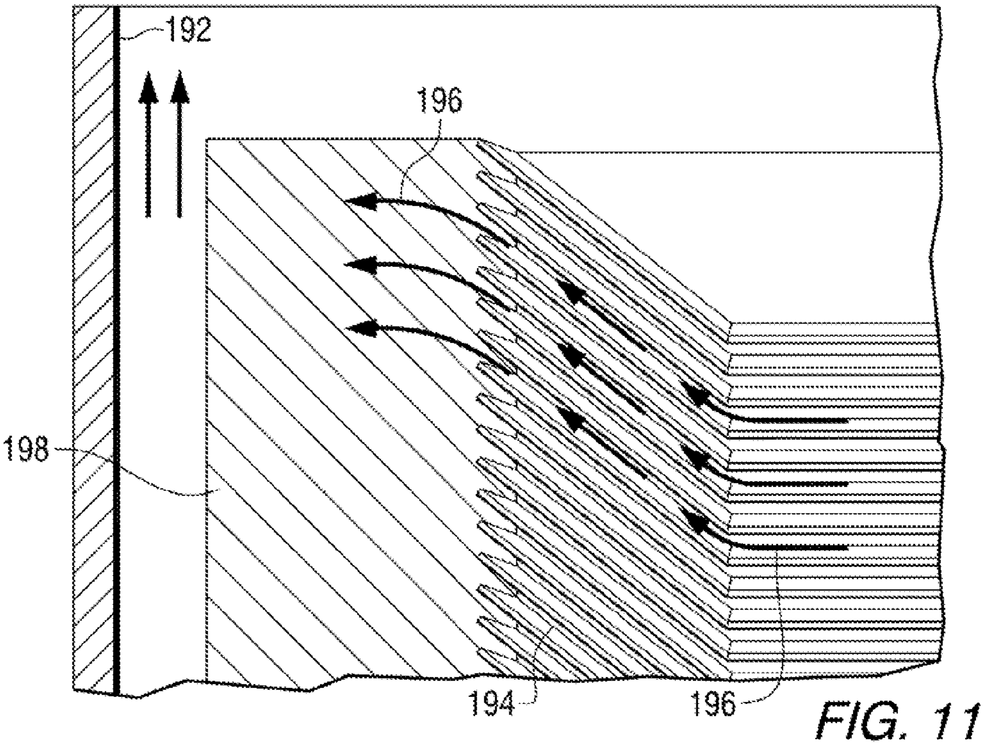
Figure 12:
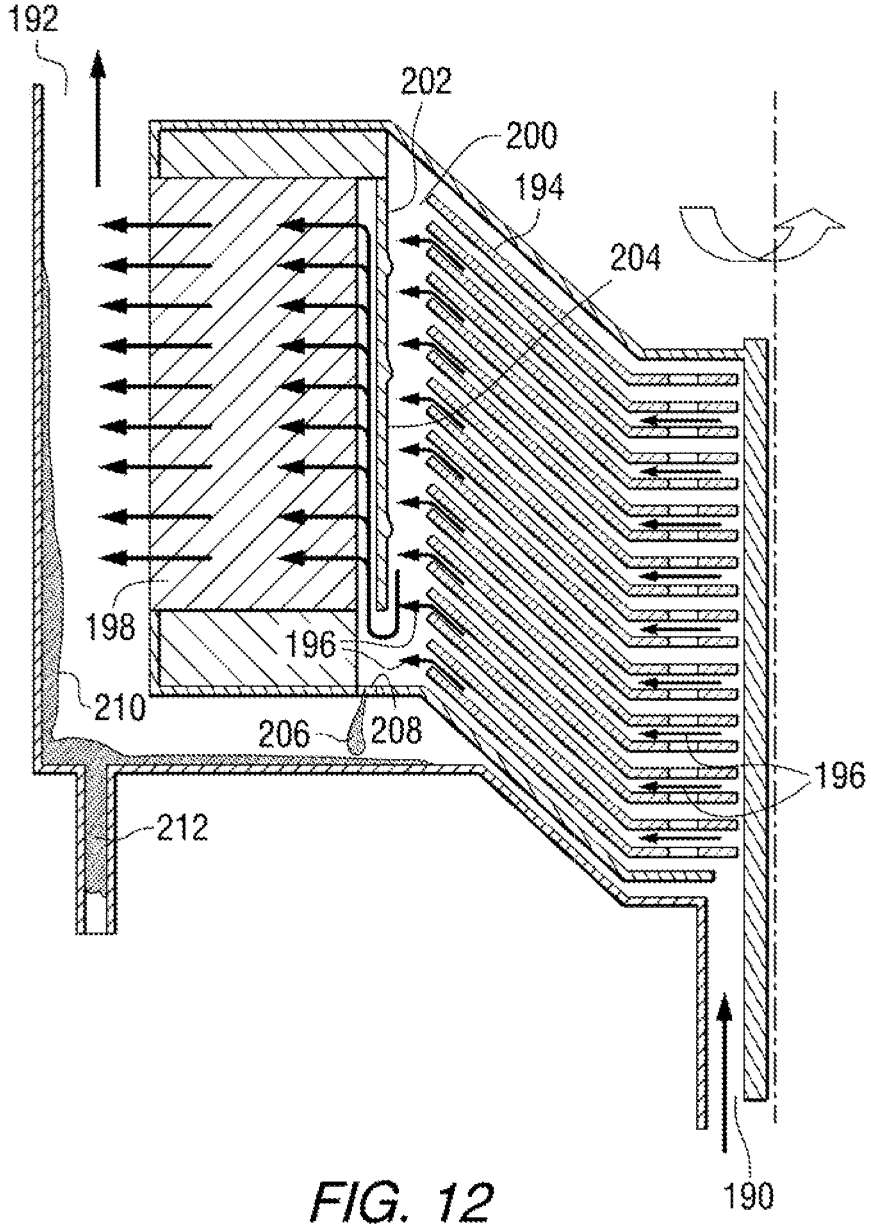

The flow path through the coalescing filter assembly is from upstream to downstream, e.g. in FIG. 1 from inlet port 38 to outlet port 42, e.g. in FIG. 2 from inlet port 38 to outlet port 68, e.g. in FIG. 10 from inlet port 190 to outlet port 192. There is further provided in FIG. 10 in combination a rotary cone stack separator 194 located in the flow path and separating air from oil in the blowby gas. Cone stack separators are known in the prior art. The direction of blowby gas flow through the rotating cone stack separator is inside-out, as shown at arrows 196, FIGS. 10-12. Rotating cone stack separator 194 is upstream of rotating coalescer filter element 198. Rotating cone stack separator 194 is in hollow interior 200 of rotating coalescer filter element 198. In FIG. 12, an annular shroud 202 is provided in hollow interior 200 and is located radially between rotating cone stack separator 194 and rotating coalescer filter element 198 such that shroud 202 is downstream of rotating cone stack separator 194 and upstream of rotating coalescer filter element 198 and such that shroud 202 provides a collection and drain surface 204 along which separated oil drains after separation by the rotating cone stack separator, which oil drains as shown at droplet 206 through drain hole 208, which oil then joins the oil separated by coalescer 198 as shown at 210 and drains through main drain 212.

Figure 13:
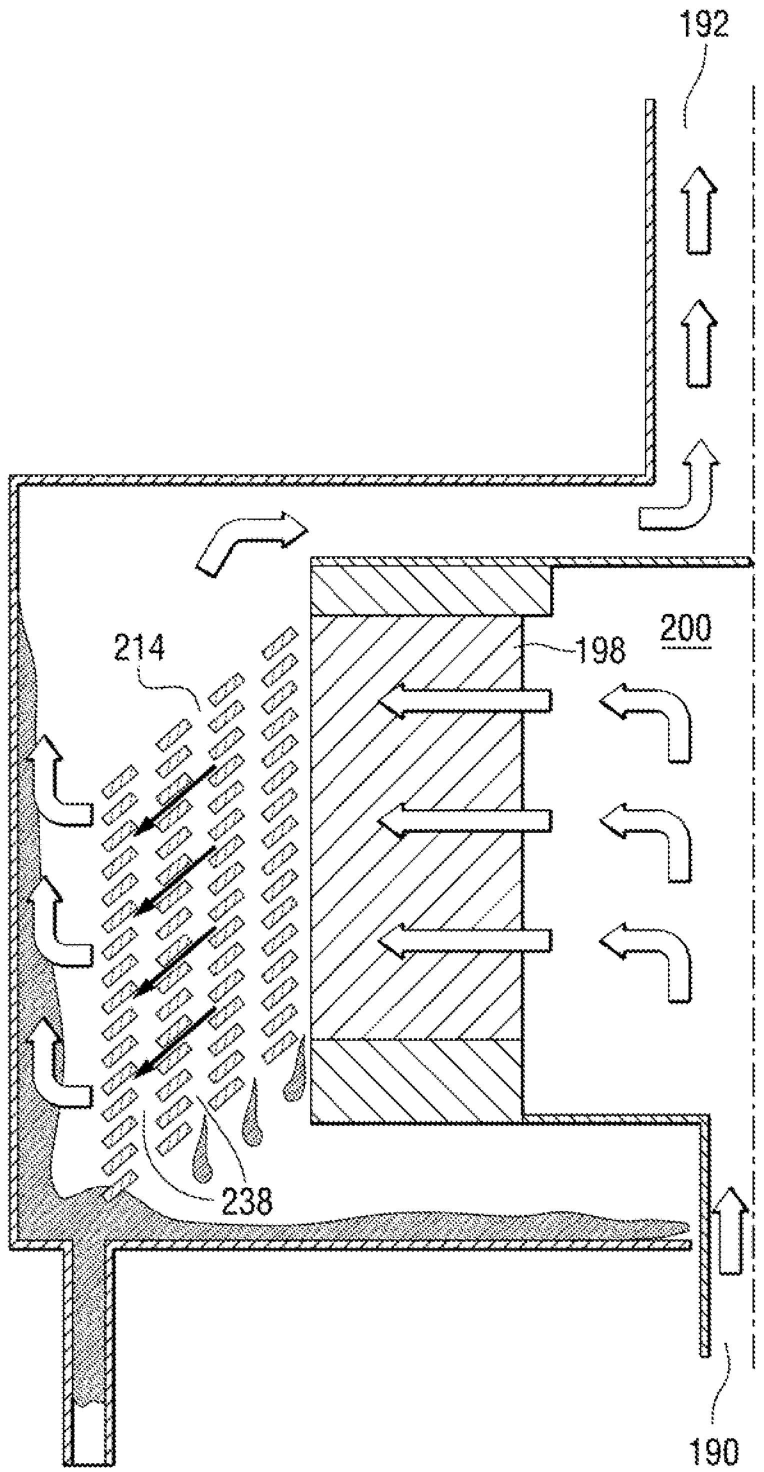

FIG. 13 shows a further embodiment and uses like reference numerals from above where appropriate to facilitate understanding. Rotating cone stack separator 214 is downstream of rotating coalescer filter element 198. The direction of flow through rotating cone stack separator 214 is inside-out. Rotating cone stack separator 214 is located radially outwardly of and circumscribes rotating coalescer filter element 198.

In various embodiments, the rotating cone stack separator may be perforated with a plurality of drain holes, e.g. 238, FIG. 13, allowing drainage therethrough of separated oil.

Figure 14:
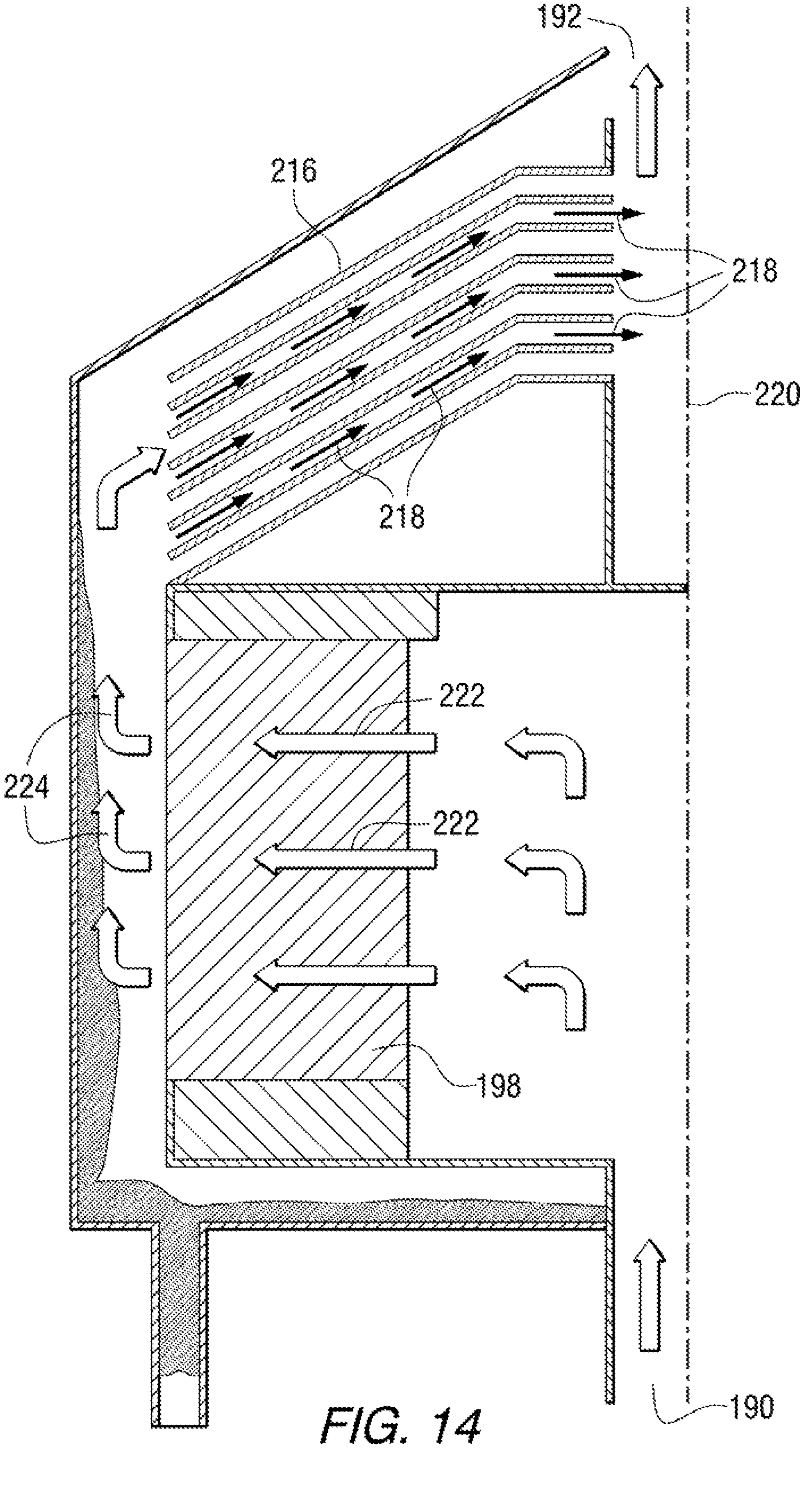

FIG. 14 shows another embodiment and uses like reference numerals from above where appropriate to facilitate understanding. Rotating cone stack separator 216 is downstream of rotating coalescer filter element 198. The direction of flow through rotating cone stack separator 216 is outside-in, as shown at arrows 218. Rotating coalescer filter element 198 and rotating cone stack separator 216 rotate about a common axis 220 and are axially adjacent each other. Blowby gas flows radially outwardly through rotating coalescer filter element 198 as shown at arrows 222 then axially as shown at arrows 224 to rotating cone stack separator 216 then radially inwardly as shown at arrows 218 through rotating cone stack separator 216.

Figure 15:
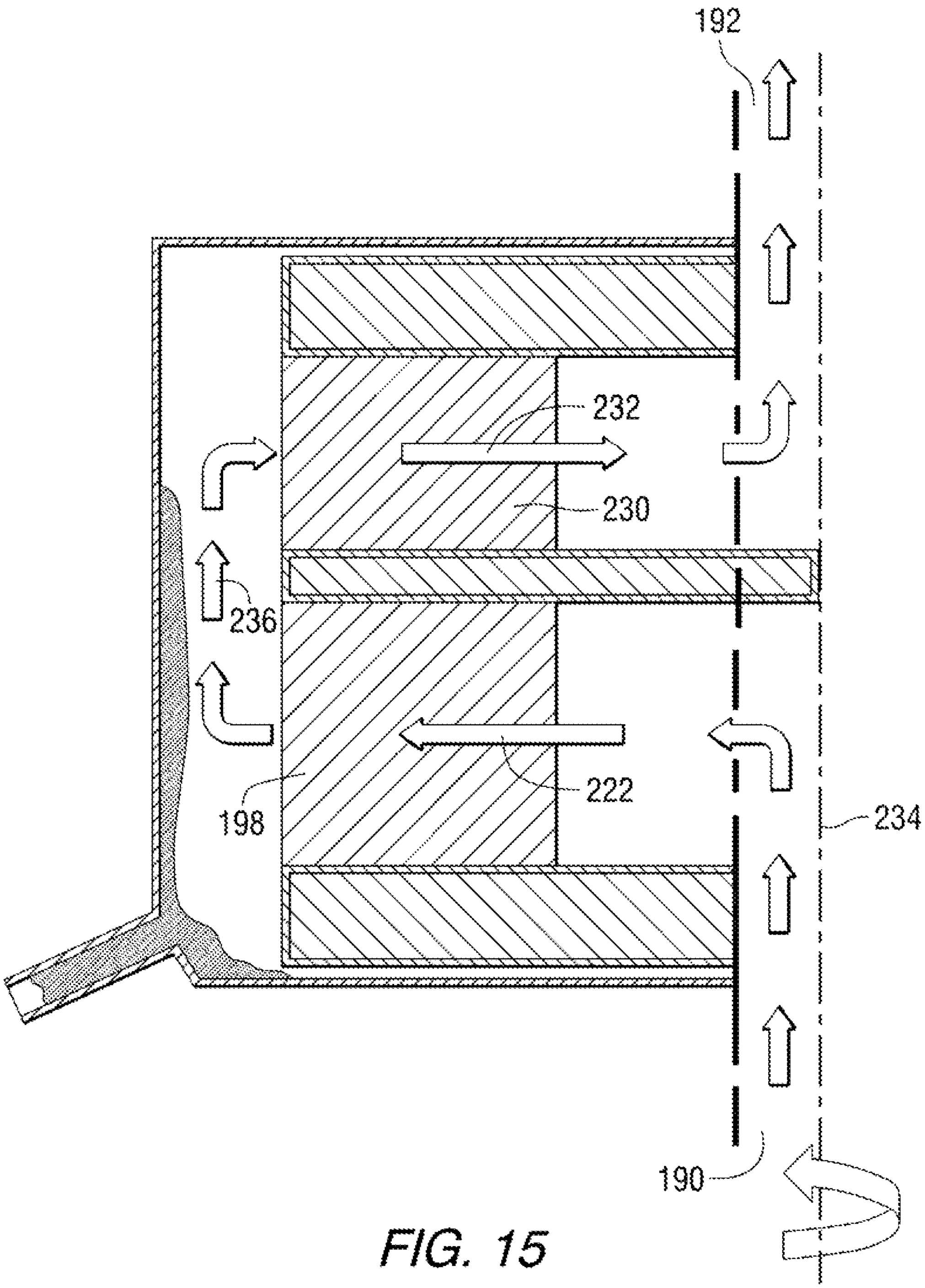

FIG. 15 shows another embodiment and uses like reference numerals from above where appropriate to facilitate understanding. A second annular rotating coalescer filter element 230 is provided in the noted flow path from inlet 190 to outlet 192 and separates air from oil in the blowby gas. The direction of flow through second rotating coalescer filter element 230 is outside-in as shown at arrow 232. Second rotating coalescer filter element 230 is downstream of first rotating coalescer element 198. First and second rotating coalescer filter elements 198 and 230 rotate about a common axis 234 and are axially adjacent each other. Blowby gas flows radially outwardly as shown at arrow 222 through first rotating coalescer filter element 198 then axially as shown at arrow 236 to second rotating coalescer filter element 230 then radially inwardly as shown at arrow 232 through second rotating coalescer filter element 230.

Figure 16:
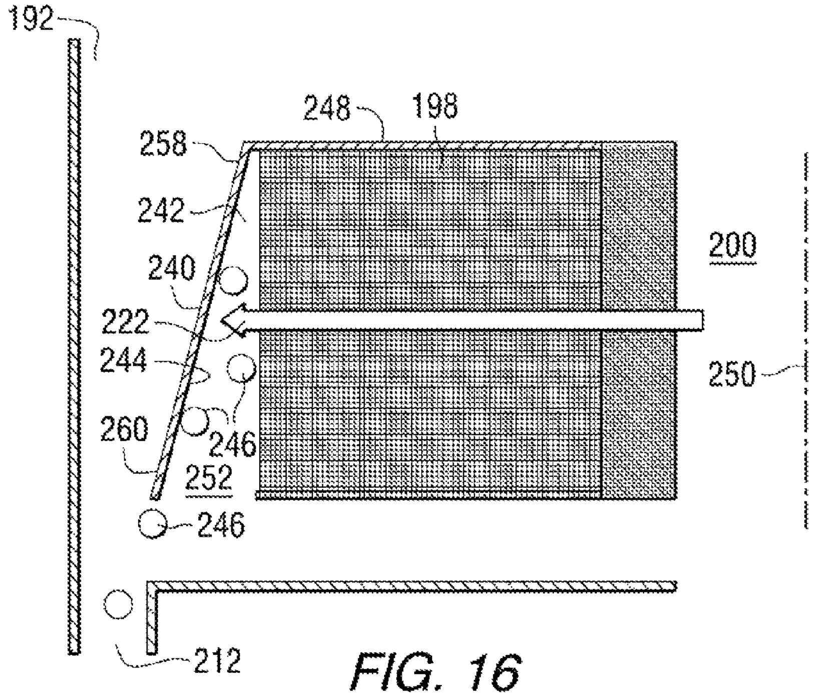
Figure 17:
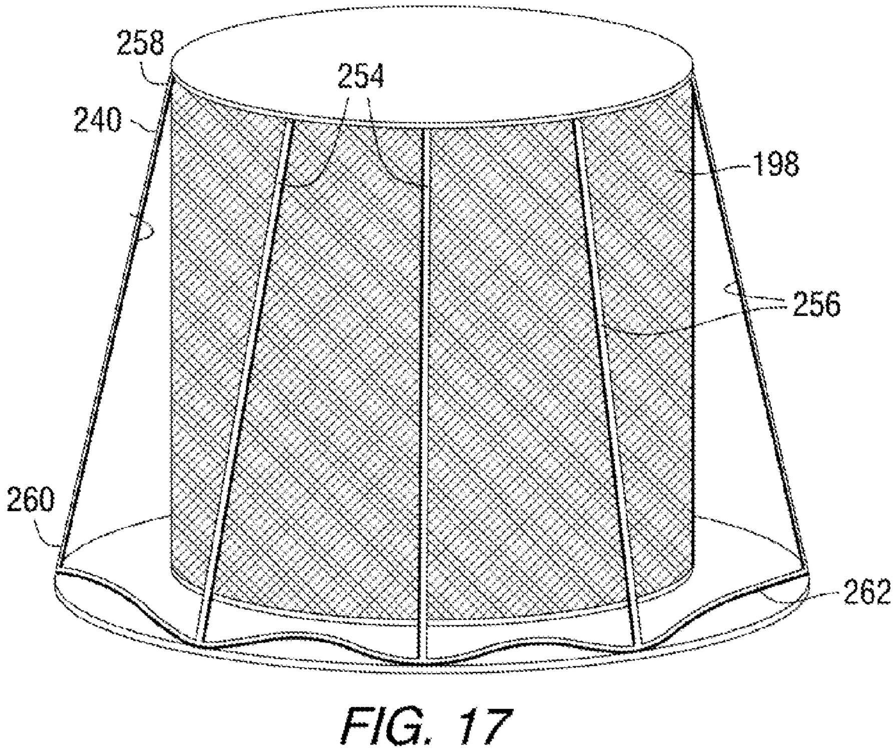

FIG. 16 shows another embodiment and uses like reference numerals from above where appropriate to facilitate understanding. An annular shroud 240 is provided along the exterior 242 of rotating coalescer filter element 198 and radially outwardly thereof and downstream thereof such that shroud 240 provides a collection and drain surface 244 along which separated oil drains as shown at droplets 246 after coalescence by rotating coalescer filter element 198. Shroud 240 is a rotating shroud and may be part of the filter frame or end cap 248. Shroud 240 circumscribes rotating coalescer filter element 198 and rotates about a common axis 250 therewith. Shroud 240 is conical and tapers along a conical taper relative to the noted axis. Shroud 240 has an inner surface at 244 radially facing rotating coalescer filter element 198 and spaced therefrom by a radial gap 252 which increases as the shroud extends axially downwardly and along the noted conical taper. Inner surface 244 may have ribs such as 254, FIG. 17, circumferentially spaced therearound and extending axially and along the noted conical taper and facing rotating coalescer filter element 198 and providing channeled drain paths such as 256 therealong guiding and draining separated oil flow therealong. Inner surface 244 extends axially downwardly along the noted conical taper from a first upper axial end 258 to a second lower axial end 260. Second axial end 260 is radially spaced from rotating coalescer filter element 198 by a radial gap greater than the radial spacing of first axial end 258 from rotating coalescer filter element 198. In a further embodiment, second axial end 260 has a scalloped lower edge 262, also focusing and guiding oil drainage.

Figure 18:
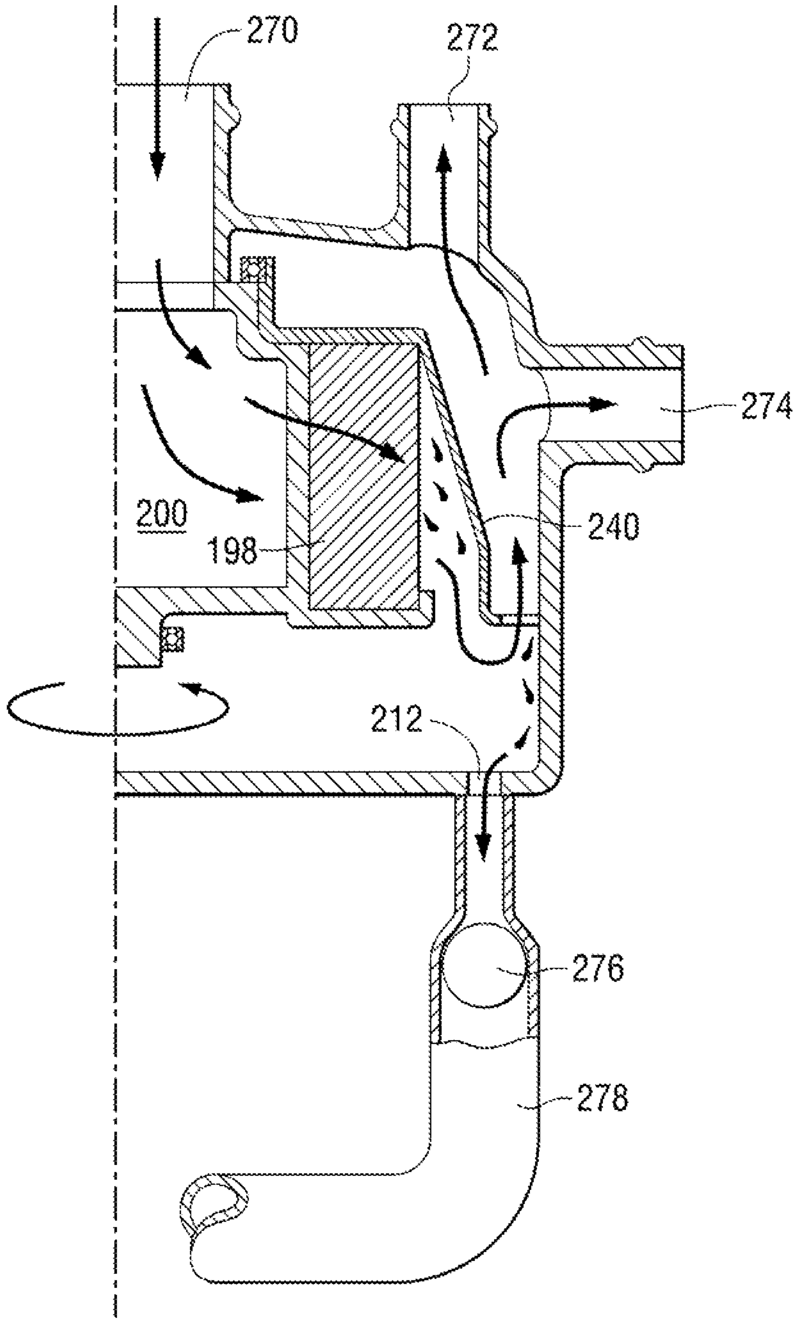

FIG. 18 shows a further embodiment and uses like reference numerals from above where appropriate to facilitate understanding. In lieu of lower inlet 190, FIGS. 13-15, an upper inlet port 270 is provided, and a pair of possible or alternate outlet ports are shown at 272 and 274. Oil drainage through drain 212 may be provided through a one-way check valve such as 276 to drain hose 278, for return to the engine crankcase, as above.

Figure 19:
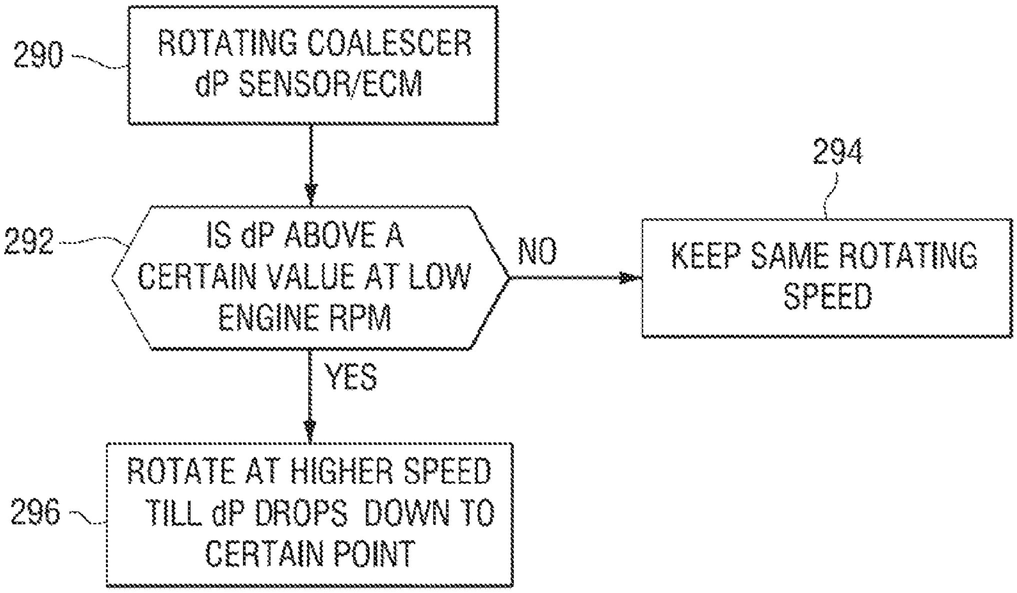

As above noted, the coalescer can be variably controlled according to a given condition, which may be a given condition of at least one of the engine, the turbocharger, and the coalescer. In one embodiment, the noted given condition is a given condition of the engine, as above noted. In another embodiment, the given condition is a given condition of the turbocharger, as above noted. In another embodiment, the given condition is a given condition of the coalescer. In a version of this embodiment, the noted given condition is pressure drop across the coalescer. In a version of this embodiment, the coalescer is a rotating coalescer, as above, and is driven at higher rotational speed when pressure drop across the coalescer is above a predetermined threshold, to prevent accumulation of oil on the coalescer, e.g. along the inner periphery thereof in the noted hollow interior, and to lower the noted pressure drop. FIG. 19 shows a control scheme wherein the pressure drop, dP, across the rotating coalescer is sensed, and monitored by the ECM (engine control module), at step 290, and then it is determined at step 292 whether dP is above a certain value at low engine RPM, and if not, then rotational speed of the coalescer is kept the same at step 294, and if dP is above a certain value then the coalescer is rotated at a higher speed at step 296 until dP drops down to a certain point. The noted given condition is pressure drop across the coalescer, and the noted predetermined threshold is a predetermined pressure drop threshold.

Figure 20:
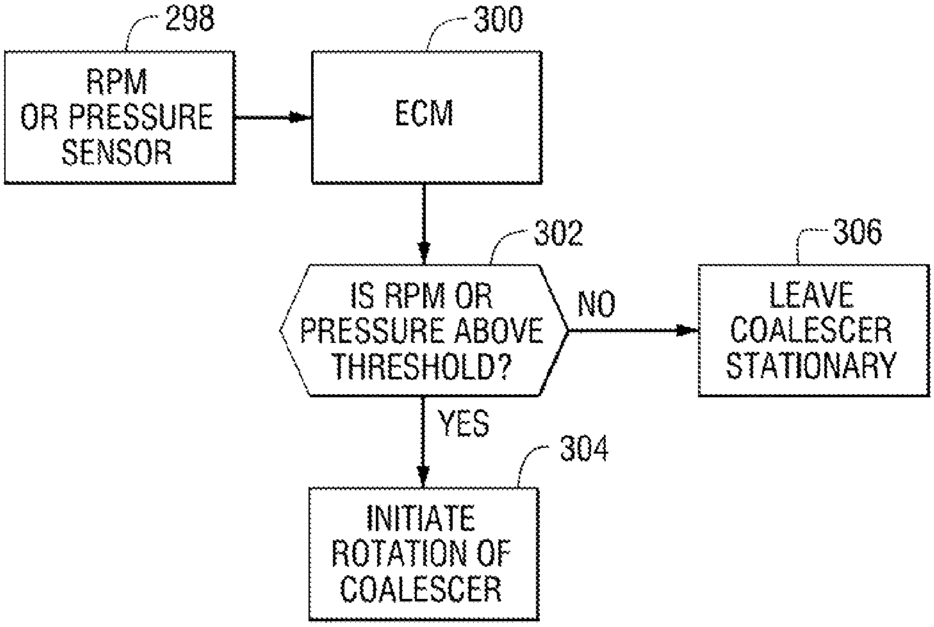
Figure 21:
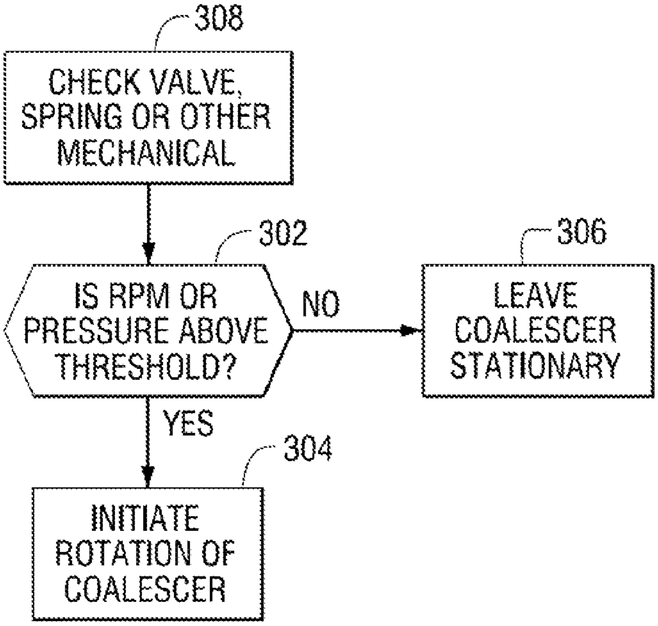

In a further embodiment, the coalescer is an intermittently rotating coalescer having two modes of operation, and is in a first stationary mode when a given condition is below a predetermined threshold, and is in a second rotating mode when the given condition is above the predetermined threshold, with hysteresis if desired. The first stationary mode provides energy efficiency and reduction of parasitic energy loss. The second rotating mode provides enhanced separation efficiency removing oil from the air in the blowby gas. In one embodiment, the given condition is engine speed, and the predetermined threshold is a predetermined engine speed threshold. In another embodiment, the given condition is pressure drop across the coalescer, and the predetermined threshold is a predetermined pressure drop threshold. In another embodiment, the given condition is turbocharger efficiency, and the predetermined threshold is a predetermined turbocharger efficiency threshold. In a further version, the given condition is turbocharger boost pressure, and the predetermined threshold is a predetermined turbocharger boost pressure threshold. In a further version, the given condition is turbocharger boost ratio, and the predetermined threshold is a predetermined turbocharger boost ratio threshold, where, as above noted, turbocharger boost ratio is the ratio of pressure at the turbocharger outlet vs. pressure at the turbocharger inlet. FIG. 20 shows a control scheme for an electrical version wherein engine RPM or coalescer pressure drop is sensed at step 298 and monitored by the ECM at step 300 and then at step 302 if the RPM or pressure is above a threshold then rotation of the coalescer is initiated at step 304, and if the RPM or pressure is not above the threshold then the coalescer is left in the stationary mode at step 306. FIG. 21 shows a mechanical version and uses like reference numerals from above where appropriate to facilitate understanding. A check valve, spring or other mechanical component at step 308 senses RPM or pressure and the decision process is carried out at steps 302, 304, 306 as above.

The noted method for improving turbocharger efficiency includes variably controlling the coalescer according to a given condition of at least one of the turbocharger, the engine, and the coalescer. One embodiment variably controls the coalescer according to a given condition of the turbocharger. In one version, the coalescer is provided as a rotating coalescer, and the method includes varying the speed of rotation of the coalescer according to turbocharger efficiency, and in another embodiment according to turbocharger boost pressure, and in another embodiment according to turbocharger boost ratio, as above noted. A further embodiment variably controls the coalescer according to a given condition of the engine, and in a further embodiment according to engine speed. In a further version, the coalescer is provided as a rotating coalescer, and the method involves varying the speed of rotation of the coalescer according to engine speed. A further embodiment variably controls the coalescer according to a given condition of the coalescer, and in a further version according to pressure drop across the coalescer. In a further version, the coalescer is provided as a rotating coalescer, and the method involves varying the speed of rotation of the coalescer according to pressure drop across the coalescer. A further embodiment involves intermittently rotating the coalescer to have two modes of operation including a first stationary mode and a second rotating mode, as above.

Present Application

FIG. 22 shows a gas-liquid rotating separator 412 separating liquid from a gas-liquid mixture 414. In one embodiment, gas-liquid mixture 414 is blowby gas from an internal combustion engine containing an air-oil mixture, though other applications are possible for other gas-liquid mixtures. The separator includes a separator assembly 416 having a housing 418 having an inlet 420 receiving the gas-liquid mixture 414, and having a gas outlet 422 discharging separated gas as shown at dashed line arrow 424, and having a drain outlet 426 discharging separated liquid as shown at solid line arrow 428. A rotating separator element 430, which in one embodiment is a coalescer element, is provided in the housing and effects separation of gas and liquid. A first set of one or more magnetically permeable members 432 is provided, as well as a second set of one or more magnetically permeable members 434. The first and second sets of magnetically permeable members 432 and 434 magnetically interact with each other to effect rotation of separator element 430. The second set of magnetically permeable members 434 is on separator element 430. Additionally or alternatively, a third set of one or more magnetically permeable members is provided at 436, and a fourth set of one or more magnetically permeable members is provided at 438. The third and fourth sets of magnetically permeable members 436 and 438 magnetically interact with each other to effect rotation of separator element 430. The fourth set of magnetically permeable members 438 is on separator element 430.

Designated operation of the separator including rotation of separator element 430 requires both of the noted first and second sets of magnetically permeable members 432 and 434, including second set of magnetically permeable members 434 on separator element 430. A replacement separator element must satisfy the same conditions, whereby a nonauthorized replacement separator element missing the noted second set of magnetically permeable members 434 will not effect the noted designated operation. Additionally or alternatively, the noted replacement authorization function may be provided by the noted sets of magnetically permeable members 436 and 438, whereby a nonauthorized replacement separator element missing the set of magnetically permeable members 438 will not effect the noted designated operation.

The first set of magnetically permeable members 432 is provided on housing 418 and provides a stator of an electric motor. The second set of magnetically permeable members 434 provides a rotor of the electric motor. Designated operation of the electric motor rotating the separator element 430 requires both the first set of magnetically permeable members 432 on housing 418 and the second set of magnetically permeable members 434 on separator element 430. The first set of magnetically permeable members 432 extends along a first periphery, and the second set of magnetically permeable members 434 extends along a second periphery. The noted first periphery surrounds the noted second periphery. Separator element 430 rotates about an axis 440 and extends axially along such axis. First set of magnetically permeable members 432 circumscribes and is spaced radially outwardly of second set of magnetically permeable members 434. The first set of magnetically permeable members may comprise a plurality of poles such as 442, FIG. 23, magnetized by electrical coil current flow as shown at 444, and wherein the second set of magnetically permeable members 434 are provided by a plurality of permanent magnets.

Separator element 430 extends axially along axis 440 between first and second axial ends 452 and 454 having respective first and second axial endcaps 456 and 458. In one embodiment, the second set of magnetically permeable members 434 is on second axial endcap 458, and the first set of magnetically permeable members 432 is on housing 418 proximate second axial endcap 458. In another embodiment, magnet sets 436, 438 are alternately or additionally used, and the noted fourth set of magnetically permeable members 438 is provided on first endcap 456, and the noted third set of magnetically permeable members 436 is provided on housing 418 proximate first axial endcap 456. First set of magnetically permeable members 432 circumscribes and is spaced radially outwardly of and radially faces second set of magnetically permeable members 434. In another embodiment, a set of magnetically permeable members 460 is provided on the axial end of the housing and axially faces a set of magnetically permeable members 462 on the axial end of endcap 458.

FIGS. 24-29 show another embodiment of a gas-liquid rotating separator 470 separating gas from a gas-liquid mixture 472. The separator assembly 474 includes a housing 476 closed by a lid 478 and having an inlet 480 receiving gas-liquid mixture 472, and having a gas outlet 482 discharging separated gas as shown at dashed line arrow 484, and having a drain outlet 486 discharging separated liquid as shown at solid line arrow 488. A rotating separator element 490, which in one embodiment is a coalescer filter element, is provided in the housing and effects separation of gas and liquid. A first set of one or more magnetically permeable members is provided at 492, and a second set of one or more magnetically permeable members is provided at 494. First and second sets of magnetically permeable members 492 and 494 magnetically interact with each other to effect rotation of separator element 490. Second set of magnetically permeable members 494 is on separator element 490. Designated operation of the separator including rotation of separator element 490 requires both of the noted first and second sets of magnetically permeable members 492 and 494, including the second set of magnetically permeable members 494 on separator element 490. This assures, at the time of maintenance servicing, that an authorized replacement separator element, including an aftermarket replacement separator element, is used, namely a replacement separator element which has the noted second set of magnetically permeable members 494 thereon. This will ensure that only certified filter elements are used and that the engine is properly protected. A nonauthorized replacement separator element missing the set of magnetically permeable members 494 will not effect the noted designated operation.

First set of magnetically permeable members 492 is provided on housing 476, FIGS. 24, 26, 29, and provides a stator of an electric motor. Second set of magnetically permeable members 494, FIGS. 24, 28, 29, provides a rotor of the electric motor. Designated operation of the electric motor rotating the separator element 490 requires both the first set of magnetically permeable members 492 on the housing and the second set of magnetically permeable members 494 on the separator element. First set of magnetically permeable members 492 extends along a first periphery, and second set of magnetically permeable members 494 extends along a second periphery, wherein the first periphery surrounds the second periphery.

Separator element 490 rotates about an axis 496 and extends axially along such axis. First set of magnetically permeable members 492 circumscribes and is spaced radially outwardly of second set of magnetically permeable members 494. First set of magnetically permeable members 492 may be provided by a plurality of poles 498, FIGS. 26, 29, magnetized by electrical coil current flow as shown at 500. Second set of magnetically permeable members 494 may be provided by permanent magnets, FIGS. 24, 28, 29.

Separator element 490 extends axially along axis 496 between first and second axially ends 502 and 504, FIGS. 24, 28, having respective first and second axial endcaps 506 and 508. Second set of magnetically permeable members 494 is on second axial endcap 508. First set of magnetically permeable members 492 is on housing 476 proximate second axial endcap 508. First set of magnetically permeable members 492 is spaced radially outwardly of and radially face second set of magnetically permeable members 494. In another embodiment, a first set of magnetically permeable members 510 on the housing, FIG. 24, axially faces a second set of magnetically permeable members 512 on second axial endcap 508. In another embodiment, second axial endcap 508 has a hub extension 514, FIGS. 24, 28, 29, extending axially therefrom along axis 496, and the second set of magnetically permeable members 494 is provided on hub extension 514. In this embodiment, housing 476 has an endplate 516 facing second axial endcap 508, and the noted first set of magnetically permeable members 492 is provided on endplate 516. Further in such embodiment, endplate 516 has a recessed cup section 518 having the first set of magnetically permeable members 492 spaced therearound and defining a central hollow pocket 520 into which hub extension 514 including second set of magnetically permeable members 494 extends axially. In the embodiment of FIGS. 24, 26, the noted hub extension and recessed cup section extend downwardly. In another embodiment, FIG. 27, the hub extension and recessed pocket may extend upwardly as shown at 522 into the hollow interior of rotating separator element 490.

In another embodiment, FIG. 30, a rotary drive member 530 is provided, and a first set of one or more magnetically permeable members 532 is provided on the rotary drive member to in turn provide a rotating magnetic flux field magnetically interacting with a second set of magnetically permeable members 534 on separator element 536 and causing rotation of the separator element. Separator element 536 may be a rotating coalescer element as above. Separator element 536 rotates about an axis 538. First and second sets of magnetically permeable members 532 and 534 face each other and circumscribe axis 538. First and second sets of magnetically permeable members 532 and 534 radially face each other. In another embodiment, a set of magnetically permeable members is provided at 540 on the separator element, and the sets of magnetically permeable members 532 and 540 axially face each other.

In various embodiments, the rotating separator element 430, 490, 536 may be an annular coalescer element, and may have inside-out flow. The annular coalescer element has an annular shape selected from the group consisting of circular, oval, oblong, racetrack, pear, triangular, rectangular, and other closed-loop shapes. In other embodiments, the rotating separator element may be a centrifuge.

The disclosure provides a replacement separator element for a gas-liquid rotating separator separating gas from a gas-liquid mixture. The noted designated operation of the assembly and rotation of the separator element requires both the noted first and second sets of magnetically permeable members, whereby a nonauthorized aftermarket replacement separator element missing the second set of magnetically permeable members will not effect the noted designated operation.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A gas-liquid rotating separator separating liquid from a gas-liquid mixture, comprising:

a separator assembly comprising a housing having an inlet receiving said gas-liquid mixture, a gas outlet discharging separated gas, and a drain outlet discharging separated liquid, a rotating separator element in said housing and effecting separation of gas and liquid, said separator element positioned within said housing such that a circumferential surface of said separator element forms a gap with an inside surface of said housing, a first set of one or more magnetically permeable members provided on an exterior surface of said housing, and a second set of one or more magnetically permeable members provided on said circumferential surface of said separator element, said first and second sets of magnetically permeable members magnetically interacting with each other to effect rotation of said separator element, wherein designated operation of said separator including rotation of said separator element requires both of said first and second sets of magnetically permeable members, including said second set of magnetically permeable members on said separator element, and wherein said separator element rotates about an axis and extends axially along said axis between first and second axial ends having respective first and second axial endcaps that rotate about said axis, said second set of magnetically permeable members is on said second axial endcap, and said first set of magnetically permeable members is on said housing proximate said second axial endcap.

2. The gas-liquid rotating separator according to claim 1 wherein said first set of magnetically permeable members is on said housing and provides a stator of an electric motor, and said second set of magnetically permeable members provides a rotor of said electric motor, wherein designated operation of said electric motor rotating said separator element requires both said first set of magnetically permeable members on said housing and said second set of magnetically permeable members on said separator element.

3. The gas-liquid rotating separator according to claim 2 wherein said first set of magnetically permeable members extends along a first periphery, said second set of magnetically permeable members extends along a second periphery, and said first periphery surrounds said second periphery.

4. The gas-liquid rotating separator according to claim 2 wherein said separator element rotates about an axis and extends axially along said axis, and said first set of magnetically permeable members circumscribes and is spaced radially outwardly of said second set of magnetically permeable members.

5. The gas-liquid rotating separator according to claim 2 wherein said first set of magnetically permeable members comprises a plurality of poles magnetized by electrical coil current flow, and said second set of magnetically permeable members comprises a plurality of permanent magnets.

6. The gas-liquid rotating separator according to claim 1 wherein said first set of magnetically permeable members circumscribes and is spaced radially outwardly of and radially faces said second set of magnetically permeable members.

7. The gas-liquid rotating separator according to claim 1 wherein said first set of magnetically permeable members axially faces said second set of magnetically permeable members.

8. The gas-liquid rotating separator according to claim 2 wherein said second axial endcap has a hub extension extending axially therefrom along said axis, said second set of magnetically permeable members is on said hub extension, said housing has an endplate facing said second axial endcap and said first set of magnetically permeable members is on said endplate.

9. The gas-liquid rotating separator according to claim 8 wherein said endplate has a recessed cup section having said first set of magnetically permeable members spaced therearound and defining a central hollow pocket into which said hub extension including said second set of magnetically permeable members extends axially.

10. The gas-liquid rotating separator according to claim 1 wherein said rotating separator element is a centrifuge.

11. A gas-liquid rotating separator separating liquid from a gas-liquid mixture, comprising:

a separator assembly comprising a housing having an inlet receiving said gas-liquid mixture, a gas outlet discharging separated gas, and a drain outlet discharging separated liquid, a rotating separator element in said housing and effecting separation of gas and liquid said separator element positioned within said housing such that a circumferential surface of said separator element forms a gap with an inside surface of said housing, a first set of one or more magnetically permeable members provided on an outside surface of said housing, and a second set of one or more magnetically permeable members provided on said circumferential surface of an endcap of said separator element, said first and second sets of magnetically permeable members magnetically interacting with each other to effect rotation of said separator element, wherein said first set of one or more magnetically permeable members comprises a plurality of permanent magnets and providing a rotating magnetic flux field magnetically interacting with said second set of magnetically permeable members on said separator element and causing rotation of said separator element.

12. The gas-liquid rotating separator according to claim 11 wherein said separator element rotates about an axis, and said first and second sets of magnetically permeable members face each other and circumscribe said axis.

13. The gas-liquid rotating separator according to claim 12 wherein said first and second sets of magnetically permeable members radially face each other.

14. The gas-liquid rotating separator according to claim 12 wherein said first and second sets of magnetically permeable members axially face each other.

15. A gas-liquid rotating separator separating liquid from a gas-liquid mixture, comprising:

a separator assembly comprising a housing having an inlet receiving said gas-liquid mixture, a gas outlet discharging separated gas, and a drain outlet discharging separated liquid, a rotating separator element in said housing and effecting separation of gas and liquid, said separator element positioned within said housing such that a circumferential surface of said separator element forms a gap with an inside surface of said housing, a first set of one or more magnetically permeable members provided on an exterior surface of said housing, and a second set of one or more magnetically permeable members, said first and second sets of magnetically permeable members magnetically interacting with each other to effect rotation of said separator element, said second set of magnetically permeable members being on said circumferential surface of said separator element, said circumferential surface being part of an endcap of said separator element, wherein said rotating separator element is an annular coalescer element.

16. The gas-liquid rotating separator according to claim 15 wherein said annular coalescer element is an inside-out flow coalescer element.

17. The gas-liquid rotating separator according to claim 15 wherein said annular coalescer element has an annular shape selected from the group consisting of circular, oval, oblong, racetrack, pear, triangular, rectangular, and other closed-loop shapes.

18. A separator element for a gas-liquid rotating separator separating liquid from a gas-liquid mixture in a separator assembly having a housing having an inlet receiving said gas-liquid mixture, a gas outlet discharging separated gas, and a drain outlet discharging separated liquid, said separator element comprising:

a rotating separator element effecting separation of gas and liquid, said separator element positioned within said housing such that a circumferential surface of said separator element forms a gap with an inside surface of said housing, said assembly having a first set of one or more magnetically permeable members provided on an exterior surface of said housing, said separator element having a second set of one or more magnetically permeable members provided on said circumferential surface of said separator element, said first and second sets of magnetically permeable members magnetically interacting with each other to effect rotation of said separator element, wherein designated operation of said assembly and rotation of said separator element requires both said first and second sets of magnetically permeable members, whereby a nonauthorized separator element missing said second set of magnetically permeable members will not affect said designated operation, and wherein said separator rotates about an axis and extends axially along said axis between first and second axial ends having respective first and second axial endcaps that rotate about said axis, said second set of magnetically permeable members is on said second axial endcap.

19. The separator element according to claim 18 wherein said second set of magnetically permeable members comprises a plurality of permanent magnets.

20. The separator element according to claim 18 wherein said second axial endcap has a hub extension extending axially therefrom along said axis, said second set of magnetically permeable members is on said hub extension.

21. The separator element according to claim 18 wherein said first set of magnetically permeable members is on said housing and provides a stator of an electric motor, and said second set of magnetically permeable members provides a rotor of said electric motor, wherein designated operation of said electric motor rotating said separator element requires both said first set of magnetically permeable members on said housing and said second set of magnetically permeable members on said separator element.

22. The separator element according to claim 21 wherein said first set of magnetically permeable members extends along a first periphery, said second set of magnetically permeable members extends along a second periphery, and said first periphery surrounds said second periphery.

23. The separator element according to claim 21 wherein said separator element rotates about an axis and extends axially along said axis, and said first set of magnetically permeable members circumscribes and is spaced radially outwardly of said second set of magnetically permeable members.

24. The separator element according to claim 21 wherein said first set of magnetically permeable members comprises a plurality of poles magnetized by electrical coil current flow, and said second set of magnetically permeable members comprises a plurality of permanent magnets.

25. The separator element according to claim 21 wherein said second set of magnetically permeable members is on said second axial endcap, and first set of magnetically permeable members is on said housing proximate said second axial endcap.

26. The separator element according to claim 25 wherein said first set of magnetically permeable members circumscribes and are spaced radially outwardly of and radially faces said second set of magnetically permeable members.

27. The separator element according to claim 25 wherein said first set of magnetically permeable members axially faces said second set of magnetically permeable members.

28. The separator element according to claim 21 wherein said second axial endcap has a hub extension extending axially therefrom along said axis, said second set of magnetically permeable members is on said hub extension, said housing has an endplate facing said second axial endcap and said first set of magnetically permeable members is on said endplate.

29. The separator element according to claim 28 wherein said endplate has a recessed cup section having said first set of magnetically permeable members spaced therearound and defining a central hollow pocket into which said hub extension including said second set of magnetically permeable members extends axially.

30. The separator element according to claim 18 wherein said separator element is a centrifuge.

31. The separator element according to claim 18 wherein said separator element is an aftermarket replacement separator element.

32. A separator element for a gas-liquid rotating separator separating liquid from a gas-liquid mixture in a separator assembly having a housing having an inlet receiving said gas-liquid mixture, a gas outlet discharging separated gas and a drain outlet discharging separated liquid, said separator element comprising:

a rotating separator element effecting separation of gas and liquid, said separator element positioned within said housing such that a circumferential surface of said separator element forms a gap with an inside surface of said housing, said assembly having a first set of one or more magnetically permeable members provided on an exterior surface of said housing, wherein said exterior surface is opposite the inside surface, said separator element having a second set of one or more magnetically permeable members provided on said circumferential surface of said separator element, said circumferential surface being part of an endcap of said separator element, said first and second sets of magnetically permeable members magnetically interacting with each other to effect rotation of said separator element, wherein designated operation of said assembly and rotation of said separator element requires both said first and second sets of magnetically permeable members, whereby a nonauthorized separator element missing said second set of magnetically permeable members will not affect said designated operation, and wherein said assembly includes a rotary drive member, and wherein said first set of one or more magnetically permeable members comprises a plurality of permanent magnets on said rotary drive member and providing a rotating magnetic flux field magnetically interacting with said second set of magnetically permeable members on said separator element and causing rotation of said separator element.

33. The separator element according to claim 32 wherein said separator element rotates about an axis, and said first and second sets of magnetically permeable members face each other and circumscribe said axis.

34. The separator element according to claim 33 wherein said first and second sets of magnetically permeable members radially face each other.

35. The separator element according to claim 33 wherein said first and second sets of magnetically permeable members axially face each other.

36. A separator element for a gas-liquid rotating separator separating liquid from a gas-liquid mixture in a separator assembly having a housing having an inlet receiving said gas-liquid mixture, a gas outlet discharging separated gas, and a drain outlet discharging separated liquid, said separator element comprising:

a rotating separator element effecting separation of gas and liquid, said separator element positioned within said housing such that a circumferential surface of said separator element forms a gap with an inside surface of said housing, said assembly having a first set of one or more magnetically permeable members provided on an exterior surface of said housing, said separator element having a second set of one or more magnetically permeable members provided on said circumferential surface of said separator element, said circumferential surface being part of an endcap of said separator element, said first and second sets of magnetically permeable members magnetically interacting with each other to effect rotation of said separator element, wherein designated operation of said assembly and rotation of said separator element requires both said first and second sets of magnetically permeable members, whereby a nonauthorized separator element missing said second set of magnetically permeable members will not affect said designated operation, and wherein said separator element is an annular coalescer element.

37. The separator element according to claim 36 wherein said annular coalescer element is an inside-out flow coalescer element.

38. The separator element according to claim 36 wherein said annular coalescer element has an annular shape selected from the group consisting of circular, oval, oblong, racetrack, pear, triangular, rectangular, and other closed-loop shapes.

* * * * *